United States Patent
Grossmann et al.

(10) Patent No.: US 11,871,220 B2
(45) Date of Patent: Jan. 9, 2024

(54) METHODS AND APPARATUSES FOR PHYSICAL UPLINK SHARED CHANNEL FOR MULTI TRANSMIT-RECEIVE-POINT COMMUNICATIONS IN A WIRELESS COMMUNICATIONS NETWORK

(71) Applicant: Fraunhofer-Gesellschaft zur Förderung der angewandten Forschung e.V., Munich (DE)

(72) Inventors: Marcus Grossmann, Erlangen (DE); Markus Landmann, Erlangen (DE); Sutharshun Varatharaajan, Erlangen (DE)

(73) Assignee: Fraunhofer-Gesellschaft zur Forderung der angewandten Forschung e.V.

( * ) Notice: Subject to any disclaimer, the term of this patent is extended or adjusted under 35 U.S.C. 154(b) by 10 days.

(21) Appl. No.: 17/910,472

(22) PCT Filed: Mar. 11, 2021

(86) PCT No.: PCT/EP2021/056269
§ 371 (c)(1),
(2) Date: Sep. 9, 2022

(87) PCT Pub. No.: WO2021/180897
PCT Pub. Date: Sep. 16, 2021

(65) Prior Publication Data
US 2023/0209567 A1    Jun. 29, 2023

(30) Foreign Application Priority Data
Mar. 11, 2020  (EP) .................................. 20162487

(51) Int. Cl.
  H04L 5/00    (2006.01)
  H04W 72/12   (2023.01)
  H04W 72/232  (2023.01)

(52) U.S. Cl.
  CPC ......... H04W 72/232 (2023.01); H04L 5/0051 (2013.01); H04L 5/0094 (2013.01); H04W 72/12 (2013.01)

(58) Field of Classification Search
  CPC ............................... H04W 72/12; H04L 5/00
  (Continued)

(56) References Cited

U.S. PATENT DOCUMENTS

2019/0174466 A1    6/2019  Zhang et al.

FOREIGN PATENT DOCUMENTS

CN    110536435 A    12/2019
EP    3454474 A1     3/2019
(Continued)

OTHER PUBLICATIONS

International Preliminary report on Patentability, dated Aug. 3, 2022, International Application No. PCT/EP2021/056269, European Patent Office.
(Continued)

*Primary Examiner* — Angel T Brockman
(74) *Attorney, Agent, or Firm* — Burr & Forman LLP; Jeffrey H. Kamenetsky, Esq.

(57) ABSTRACT

The embodiments relate to methods and apparatuses for enabling transmission of at least one PUSCH. A method comprises: configuring a UE to receive a single PDCCH or a higher layer grant that schedules at least one PUSCH transmission occasion. If one PUSCH transmission occasion is scheduled: scheduling the UE to transmit at least two segments of the PUSCH, each segment is associated with a transmission setting comprising a set of transmission param- (Continued)

```
SRS-ResourceSet ::=                   SEQUENCE {
    srs-ResourceSetId          SRS-ResourceSetId,
    srs-ResourceIdList         SEQUENCE (SIZE(1..maxNrofSRS-ResourcesPerSet)) OF
                                   SRS-ResourceId    OPTIONAL,    -- Cond Setup ---<All other parameters of 'SRS-ResourceSet' not shown>--- usage                      ENUMERATED {beamManagement,
                                   codebook, nonCodebook, antennaSwitching},
    alpha                      Alpha              OPTIONAL, -- Need S
    p0                                            INTEGER (-202..24)
                                                  OPTIONAL, -- Cond Setup
    pathlossReferenceRS        CHOICE {
        ssb-Index              SSB-Index,
        csi-RS-Index           NZP-CSI-RS-ResourceId
    }                                             OPTIONAL, -- Need M
    srs-PowerControlAdjustmentStates        ENUMERATED { sameAsFci2,
                                   separateClosedLoop} OPTIONAL, -- Need S
    ...
}
```

SRS resource set configuration (SoTA) [6])

eters, at least one transmission parameter associated with one of the segments is different from the corresponding transmission parameter associated with at least one other segment. If more than one PUSCH transmission occasion is scheduled, each PUSCH transmission occasion is associated with a transmission setting, wherein at least one transmission parameter associated with one of the PUSCH transmission occasions is different from the corresponding transmission parameter associated with one other PUSCH transmission occasion.

17 Claims, 8 Drawing Sheets

(58) Field of Classification Search
USPC .......................................................... 370/329
See application file for complete search history.

(56) References Cited

FOREIGN PATENT DOCUMENTS

| JP | 2019-506062 A | 2/2019 |
| WO | WO 2019/032748 A1 | 2/2019 |
| WO | WO 2019/156466 A1 | 8/2019 |
| WO | WO 2020/040179 A1 | 2/2020 |

OTHER PUBLICATIONS

3GPP TSG RAN WG1 Meeting #AH1901, Taipei, Jan. 21-25, 2019—R1-1900939, PUSCH Enhancement for URLLC.
3GPP TSG RAN WGI #97, Reno, USA, May 13-17, 2019, R1-1906029, Enhancements on Multii-TRP/Penel Transmission.

```
SRS-ResourceSet ::=               SEQUENCE {
    srs-ResourceSetId             SRS-ResourceSetId,
    srs-ResourceIdList            SEQUENCE (SIZE(1..maxNrofSRS-ResourcesPerSet)) OF
                                     SRS-ResourceId   OPTIONAL,    -- Cond Setup
    -----<All other parameters of 'SRS-ResourceSet' not shown>-----
    ;
    }
    usage                         ENUMERATED {beamManagement,
                                     codebook, nonCodebook, antennaSwitching},
    alpha                         Alpha                OPTIONAL,   -- Need S
    p0                            INTEGER (-202..24)
                                                       OPTIONAL,   -- Cond Setup
    pathlossReferenceRS           CHOICE {
        ssb-Index                 SSB-Index,
        csi-RS-Index              NZP-CSI-RS-ResourceId
    }                                                  OPTIONAL,   -- Need M
    srs-PowerControlAdjustmentStates     ENUMERATED { sameAsFci2,
                                     separateClosedLoop} OPTIONAL, -- Need S
    ...
}
```

Figure 1: SRS resource set configuration (SoTA) [6]

```
SRS-Resource ::=                SEQUENCE {
    srs-ResourceId              SRS-ResourceId,
    nrofSRS-Ports               ENUMERATED {port1,ports2,ports4},
    ...
    ------<All other parameters of 'SRS-ResourceSet' not shown>------
    ...
    spatialRelationInfo         SRS-SpatialRelationInfo     OPTIONAL,    -- Need R
    ...
}

SRS-SpatialRelationInfo ::=     SEQUENCE {
    servingCellId                           ServCellIndex   OPTIONAL,    -- Need s
    referenceSignal                         CHOICE {
        ssb-Index                               SSB-Index,
        csi-RS-Index                            NZP-CSI-RS-ResourceId,
        srs                                     SEQUENCE {
            resourceId                              SRS-ResourceId,
            uplinkBWP                               BWP-Id
        }
    }
}
```

Figure 2: SRS resource configuration (SoTA [6])

METHODS AND APPARATUSES FOR PHYSICAL UPLINK SHARED CHANNEL FOR MULTI TRANSMIT-RECEIVE-POINT COMMUNICATIONS IN A WIRELESS COMMUNICATIONS NETWORK

CROSS-REFERENCE TO RELATED APPLICATION

This application is a national stage application, filed under 35 U.S.C. § 371, of International Patent Application No. PCT/EP2021/056269 filed on Mar. 11, 2021, and European Patent Application No. 20162487.1 filed on Mar. 11, 2020, which are incorporated by reference herein in their entirety.

TECHNICAL FIELD

The present disclosure relates to the field of wireless communications, and in particular to methods and apparatuses for enabling physical uplink shared channel (PUSCH) for multi transmit-receive-point (TRP) communications in a wireless communications network such as 5G.

BACKGROUND

Wireless transmissions from multiple transmit-receive points (TRPs) to a user equipment (UE) or from a single UE to multiple TRPs help in improving coverage, reliability and throughput of the transmissions. A TRP may refer to a base station and one or more base stations may be associated with a network node (e.g., gNodeB or gNB). A TRP may also refer to an antenna panel. For example, a base station may be equipped with two panels, where each panel may correspond to a TRP.

The Third Generation Partnership Project Release 16, (3GPP Rel. 16) specifies methods for multi-TRP transmissions in the downlink while only single TRP transmissions are possible in the uplink. Similar to multi-TRP transmissions in the downlink, the coverage, reliability and throughput of transmission may also be improved in the uplink by transmitting to multiple TRPs. The issues in scheduling multi-TRP transmissions in the UL are starkly different from the ones faced in DL multi-TRP transmissions. While in the DL, it is a non-coherent transmission scenario, it is a non-coherent reception scenario in the uplink. Some of the issues to be considered in the scheduling of multi-TRP UL transmissions are as follows: indication of antenna port(s) at the UE, power control for the UL transmissions, time-frequency resource usage, multiplexing methods to be used and beam management among others.

In millimeter wave (mmWave) frequencies (frequency range 2 (FR2)), i.e., frequencies above 6 GHz, in general, wireless communication between communication devices is performed with spatially selective/directive transmissions and receptions called beams. Therefore, beam management is a vital framework for link establishment, adaptation and recovery at FR2.

In 3GPP Re. 16, beam management in uplink (UL) is handled separately for various UL channels and UL reference signals. The functionalities of the UL beam management framework are spread over three communication layers—the physical (PHY) layer [1-4], the medium access control (MAC) layer [5] and the Radio Resource Control (RRC) layer [6]. In order to enable a beamformed uplink transmission between a UE and a radio network node (gNB), the beam management performs two tasks: Indication of the beam direction for the UL transmission, and indication of the transmit power settings associated with it. The two tasks are handled in different ways for the physical uplink shared channel (PUSCH), the physical uplink control channel (PUCCH) and the sounding reference signal (SRS).

On the other hand, in the downlink (DL), the UE must be given directives to derive various parameters such as delay spread, average delay, Doppler and Rx beam direction for the reception of a DL channel or reference signal (RS).

The term 'beam' is used in the following to denote a spatially selective/directive transmission of an outgoing signal or reception of an incoming signal which is achieved by precoding/filtering the signal at the antenna ports of the device with a particular set of coefficients. The words precoding or filtering may refer to processing of the signal in the analog or digital domain. The set of coefficients used to spatially direct a transmission/reception in a certain direction may differ from one direction to another direction. The term 'Tx beam' denotes a spatially selective/directive transmission and the term 'Rx beam' denotes a spatially selective/directive reception. The set of coefficients used to precode/filter the transmission or reception is denoted by the term 'spatial filter'. The term 'spatial filter' is used interchangeably with the term 'beam direction' in this document as the spatial filter coefficients determine the direction in which a transmission/reception is spatially directed to.

The 'spatial relation' for an UL channel 'Uc' or RS 'Ur' with respect to or with reference to a DL or UL Reference Signal (RS) 'R' means that the UE uses the spatial filter used to receive or transmit the RS 'R' to transmit the UL channel 'Uc' or RS 'Ur', or it means that the UE uses the spatial filter used to receive or transmit the RS 'R' as a reference to determine the spatial filter used to transmit the UL channel 'Uc' or RS 'Ur'.

The term 'higher layer', when used in isolation, denotes in the following any communication layer above the physical layer in the protocol stack.

The term serving cell and Carrier Component (CC) may be used interchangeably in this disclosure as a serving cell configured for a UE and is usually a separate physical carrier with a certain carrier frequency. Depending on the frequency of a component carrier/serving cell, the size of the cell and the beamformed reference signals may vary.

In the following, the state of the art (SoTA) on DL channels, the SRSs and the PUSCH is presented. The issues to be considered to schedule PUSCH transmissions to multiple TRPs are then discussed followed by the solutions to address concerned issues.

Downlink Transmission Configuration Indication

The physical downlink control channel (PDCCH) and the physical downlink shared channel (PDSCH) carry DL control information and DL data, respectively, to a UE [1-6].

The PDCCH is configured at the Radio Resource Control (RRC) layer level by a base station or a network node or gNodeB (gNB). The gNB transmits the PDCCH(s) on one or more Control Resource Sets (CORESETs) that are configured at RRC level. A CORESET is a set of resource blocks carrying control information. Each CORESET comprises one or more PDCCH(s), each linked to a search space configuration. The UE monitors the configured search spaces to obtain the PDCCH(s). A PDCCH is either part of a common search space (CSS) or a UE-specific Search Space (USS). PDCCHs belonging to the CSS usually contain information that is broadcast by the gNB to all UEs, like system information broadcast or paging information. The PDCCHs belonging to a USS contain UE specific information, such as the Downlink Control Information (DCI) to schedule a PDSCH or PUSCH or SRS trigger, etc.

It should be noted that the terms PDCCH and DCI may be used interchangeably in this disclosure. Both terms refer to a downlink control channel information obtained via the physical layer.

Demodulation Reference Signals (DMRS) are embedded for the coherent demodulation of the PDCCH/PDSCH at the UE. The DMRS consists of a set of DMRS ports. In the case of PDSCH, the number of DMRS ports determines the number of transmission layers contained in a PDSCH. DMRS is used for channel estimation at the UE to coherently demodulate the PDSCH or PDCCH(s). In the case of PDCCH, one or more of them may be transmitted on a CORESET.

Therefore, the DMRS for the coherent demodulation of the PDCCH(s) on the CORESET may be embedded across the PDCCH(s) transmitted on the CORESET.

Sounding Reference Signals (SRSs)

Sounding Reference Signals (SRSs), as the name suggests, are used for sounding the UL channel. The basic unit of the SRS is an SRS resource. An SRS resource is a specific pattern of reference symbols in time, frequency and code transmitted by all or a subset of UE's antenna ports in the UL to sound the UL channel. The UE is configured by the gNB via the RRC with one or more SRS resource sets, with each SRS resource set consisting of one or more SRS resources. The RRC information elements (IEs) that configure the SRS resource set and the SRS resource with the SRS-SpatialRelationInfo are shown in FIG. 1 and FIG. 2, respectively [6].

As indicated in the SRS set configuration provided in FIG. 1, the parameter 'usage' indicates the purpose for which the SRS is used:

1) Usage='codebook': to sound the UL channel before a codebook-based-PUSCH transmission is performed by the UE.
2) Usage='non-codebook': to sound the UL channel before a non-codebook-based-PUSCH transmission is performed by the UE.
3) Usage='beamManagement': to sound the UL channel with beamformed SRS resources to identify suitable UL beams.
4) Usage='antennaSwitching': to sound the UL channel to obtain DL channel information.

In the case of codebook and non-codebook-based SRS transmissions, the gNB measures the SRS resource(s) and provides digital precoding/port-selection information to the UE for the following PUSCH transmission. In case of 'beamManagement' SRS, the UE beamforms the SRS in various directions for the gNB to determine suitable UL beam(s). The chosen beam(s) are used to indicate the spatial relation, i.e., beam direction for PUCCH and/or PUSCH and/or other SRS resources (the parameter 'spatialRelationInfo' contains the RS used to indicate the RS used as the spatial relation for the SRS resource which may be a Channel State Information Reference Signal—CSI-RS, Synchronization Signal Block—SSB or SRS). The 'antennaSwitching' SRS is used to exploit channel reciprocity and to obtain channel DL information via UL sounding so that the gNB may precode DL transmissions with more accurate CSI.

Physical Uplink Shared Channel (Pusch)

The PUSCH transmission(s) from a UE can be dynamically scheduled by a network node via an UL grant indicated in the PDCCH or semi-persistently/statically scheduled with the higher layer configured grant configuredGrantConfig. The configured grant Type 1 PUSCH transmission is semi-statically configured to operate upon the reception of a higher layer parameter of configuredGrantConfig including rrc-ConfiguredUplinkGrant without the detection of an UL grant in the PDCCH. The configured grant Type 2 PUSCH transmission is semi-persistently scheduled by an UL grant in a valid activation DCI/PDCCH [3] after the reception of the higher layer parameter configuredGrantConfig not including rrc-ConfiguredUplinkGrant [4].

The higher layer configuration of the PUSCH and the configuredGrantConfig according to the New Radio (NR) specifications are shown in the following:

Higher Layer Configuration of PUSCH [6]

| Higher layer configuration of PUSCH [6] | | |
| --- | --- | --- |
| PUSCH-Config ::= | SEQUENCE { | |
| dataScramblingIdentityPUSCH | INTEGER (0..1023) | |
| | OPTIONAL, | -- Need S |
| txConfig | ENUMERATED {codebook, nonCodebook} | |
| | OPTIONAL, | -- Need S |
| dmrs-UplinkForPUSCH-MappingTypeA | SetupRelease {DMRS-UplinkConfig} | |
| | OPTIONAL, | -- Need M |
| dmrs-UplinkForPUSCH-MappingTypeB | SetupRelease {DMRS-UplinkConfig} | |
| | OPTIONAL, | -- Need M |
| pusch-PowerControl | PUSCH-PowerControl | |
| | OPTIONAL, | -- Need M |
| frequencyHopping | ENUMERATED (intraslot, interSlot) | |
| | OPTIONAL, | -- Need S |
| frequencyHoppingOffsetLists | SEQUENCE (SIZE (1..4)) OF INTEGER (1.. maxNrofPhysicalResourceBlocks1) | |
| | OPTIONAL, | -- Need M |
| resourceAllocation | ENUMERATED {resourceAllocationType0, resourceAllocationType1, dynamicSwitch}, | |
| pusch-TimeDomainAllocationList | SetupRelease {PUSCH-TimeDomainResourceAllocationList} | |
| | OPTIONAL, | -- Need M |
| pusch-AggregationFactor | ENUMERATED {n2, n4, n8} | |
| | OPTIONAL, | -- Need S |
| mcs-Table | ENUMERATED {qam256, qam64LowSE} | |
| | OPTIONAL, | -- Need S |
| mcs-TableTransformPrecoder | ENUMERATED {qam256, qam64LowSE} | |
| | OPTIONAL, | -- Need S |
| transformPrecoder | ENUMERATED {enabled, disabled} | |
| | OPTIONAL, | -- Need S |

-continued

| Higher layer configuration of PUSCH [6] | | | |
|---|---|---|---|
| codebookSubset | ENUMERATED {fullyAndPartialAndNonCoherent, partialAndNonCoherent, nonCoherent} | | |
| | | OPTIONAL, | -- Cond codebookBased |
| maxRank | INTEGER (1..4) | | |
| | | OPTIONAL, | -- Cond codebookBased |
| rbg-Size | ENUMERATED { config2} | | |
| | | OPTIONAL, | -- Need S |
| uci-OnPUSCH | SetupRelease { UCI-OnPUSCH} | | |
| | | OPTIONAL, | -- Need M |
| tp-pi2BPSK | ENUMERATED {enabled} | | |
| | | OPTIONAL, | -- Need S |
| ..., | | | |
| } | | | |
| UCI-OnPUSCH ::= | SEQUENCE { | | |
|   betaOffsets | CHOICE { | | |
|     dynamic | SEQUENCE (SIZE (4)) OF BetaOffsets, | | |
|     semiStatic | BetaOffsets | | |
|   } | | OPTIONAL, | -- Need M |
|   scaling | ENUMERATED { f0p5, f0p65, f0p8, f1 } | | |
| } | | | |

Higher Layer Configuration of ConfiguredGrantConfig [6]

| Higher configuration of configuredGrantConfig [6] | | | |
|---|---|---|---|
| ConfiguredGrantConfig ::= | SEQUENCE { | | |
|   frequencyHopping | ENUMERATED (intraSlot, interSlot) | | |
| | | OPTIONAL, | -- Need S |
|   cg-DMRS-Configuration | DMRS-UplinkConfig, | | |
|   mcs-Table | ENUMERATED (qam256, qam64LowSE) | | |
| | | OPTIONAL, | -- Need S |
|   mcs-TableTransformPrecoder | ENUMERATED (qam256, qam64LowSE) | | |
| | | OPTIONAL, | -- Need S |
|   uci-OnPUSCH | SetupRelease (CG-UCI-OnPUSCH) | | |
| | | OPTIONAL, | -- Need M |
|   resourceAllocation | ENUMERATED (resourceAllocationType0, resourceAllocationType1, dynamicSwitch), | | |
|     ENUMERATED {config2} | | | |
| | | OPTIONAL, | -- Need S |
|   powerControlLoopToUse | ENUMERATED {n0, n1}, | | |
|   P0-PUSCH-Alpha | P0-PUSCH-AlphaSetId, | | |
|   transformPrecoder | ENUMERATED {enabled, disabled} | | |
| | | OPTIONAL, | -- Need S |
|   nrofHARQ-Processes | INTEGER(1..16) , | | |
|   repK | ENUMERATED {n1, n2, n4, n8}, | | |
|   repK-RV | ENUMERATED {s1-0231, s2-0303, s3-0000} | | |
| | | OPTIONAL, | -- Need R |
|   periodicity | ENUMERATED {sym2, sym7, sym1x14, sym2x14; sym4x14, sym5x14, sym8x14, sym10x14, sym16x14, sym20x14, sym32x14, sym40x14, sym64x14, sym80x14, sym128x14, sym160x14, sym256x14, sym320x14, sym512x14, syn640x14, sym1024x14, sym1280x14, sym2560x14, sym5120x14, sym6, sym1x12, sym2x12, sym4x12, sym5x12, sym8x12, sym10x12, sym16x12, sym20x12, sym32x12, sym40x12, sym64x12, syn80x12, sym128x12, sym160x12, sym256x12, sym320x12, sym512x12, sym640x12, sym1280x12, sym2560x12}, | | |
|   configuredGrantTimer | INTEGER (1..64) | | |
| | | OPTIONAL, | -- Need R |
|   rrc-ConfiguredUplinkGrant | SEQUENCE { | | |
|     timeDomainOffset | INTEGER (0..5119), | | |
|     timeDomainAllocation | INTEGER (0..15), | | |
|     frequencyDomainAllocation | BIT STRING (SIZE (18)), | | |
|     antennaPort | INTEGER (0..31), | | |
|     dmrs-SeqInitialization | INTEGER (0..1) | | |
| | | OPTIONAL, | -- Need R |

| Higher configuration of configuredGrantConfig [6] |
| --- |
| ```
        precodingAndNumberOfLayers       INTEGER (0..63),
        srs-ResourceIndicator            INTEGER (0..15)
                                                             OPTIONAL,       -- Need R
        mcsAndTBS                        INTEGER (0..31),
        frequencyHoppingOffset           INTEGER (1..
                                              maxNrofPhysicalResourceBlocks-1)
                                                             OPTIONAL,       -- Need R
        pathlossReferenceIndex           INTEGER (0..
                                              maxNrofPUSCH-PathlossReferenceRSs-1),
                                                             OPTIONAL,       -- Need R
    }
}
CG-UCI-OnPUSCH ::= CHOICE {
    Dynamic                 SEQUENCE (SIZE (1..4)) OF BetaOffsets,
    semiStatic              BetaOffsets}
``` |

As mentioned earlier, the terms PDCCH or DCI may be interchangeably used herein to denote the control information in the downlink obtained via the physical layer.

The mode of transmission of the PUSCH is determined by the higher layer parameter 'txConfig'. The parameter can be set to either 'codebook' or 'nonCodebook' or it may not be configured. When the PUSCH is scheduled via the PDCCH, two different downlink control information (DCI) formats may be used in the scheduling-PDCCH-DCI format 0_0 or DCI format 0_1. Codebook- and non-codebook-based PUSCH transmissions are scheduled using DCI format 0_1 [4], when scheduled via the PDCCH. When 'txConfig' is not configured, the UE does not expect the PUSCH to be scheduled using DCI format 0_1. When the PUSCH is scheduled with DCI format 0_0, the UE uses a single port for the PUSCH transmission [4].

The following sequence of events may happen in the scheduling of a PUSCH in codebook or non-codebook mode (the actions performed by the UE are configured via a network node):

0) An optional step '0' may happen in certain UEs: the UEs uses beam management SRS for the sounding of the UL channel with both TRPs and determines suitable beam directions for both TRPs. This step may be required by UEs without beam correspondence to align the DL and UL beams. A UE may indicate that it satisfies beam correspondence when it is able to align a beam direction in the UL solely based on DL measurements [7-8]. A UE does not satisfy beam correspondence when it needs UL sounding to align the UL beam.

1) A 'codebook'- or 'nonCodebook'-configured SRS resource set is transmitted by the UE to sound the channel between the UE and the TRP/base station (which may also correspond to a gNB). The SRS resources in the resource set are assigned with the appropriate spatial relations (they may be borrowed from the beam directions obtained from the SRS sounding in step 0). Furthermore, the SRS resource set is assigned with a pathloss reference RS that is associated with the TRP/gNB.

2) The network node schedules the PUSCH by indicating one or more SRS resource(s) from the SRS resource set used in the UL sounding in step 1 to indicate the transmission of the PUSCH. In the disclosure, SRS resource set may be referred to as the 'SRS resource set associated with the PUSCH scheduling' or just 'associated SRS resource set'.

When scheduling the PUSCH, various transmission parameters need to be indicated either in the higher layer grant or the DCI/PDCCH scheduling the PUSCH or via other higher layer signaling. Some of the transmission parameters of are discussed briefly below:

Redundancy Version

The PUSCH is transmitted in units of transport block—a transport block (TB) is a block of B bits received by the physical layer from the layer above for transmission. The allowed values for B are provided in [4]. To the transport block a set of L cyclic redundancy check (CRC) parity bits is added. The size of the TB along with the CRC is therefore $B_{tot}=B+L$. Then channel coding using low density parity check (LDPC) coding is performed on the $B_{tot}$ bits of the PUSCH and the encoded bits are processed by a rate matcher so that the number of encoded bits may match to a predetermined code rate for the PUSCH. The rate matcher essentially punctures certain bits from the bit stream to match to a given code rate. The pattern of the punctured bits or the set of bits selected by the rate matcher for is determined by the 'redundancy version'. The redundancy version to be applied for a PUSCH TB is indicated in the PDCCH or the higher layer grant that schedules the PUSCH. The encoding and rate matching may split the incoming TB (along with the corresponding CRC parity bits) into one or more code blocks depending on the size of the incoming TB. The outputs of the encoder and the rate matcher for the segmented code blocks of a certain transport block are concatenated into a 'codeword'. Therefore, the transport block is the bitstream at the input to the encoder-rate-matcher module and the output of the module is the codeword. The codeword is then scrambled, modulated with a given modulation order and mapped to a given number of layers before transmission [1-4].

When scheduling the transmission of a PUSCH TB, the UE indicates a Hybrid Automatic Repeat Request (HARQ) process ID. The process ID is used as an identification of the TB. The acknowledgements of the reception of the TB sent by the UE or the retransmissions of the transport block scheduled by the gNB are associated with the HARQ process ID. The acknowledgements and the retransmissions help in improving the reliability of the PUSCH. The redundancy version also has a crucial role to play in PUSCH reliability. When a PUSCH transport block is transmitted and is decoded incorrectly at the TRP/base station or gNB, the TRP/base station or gNB may indicate, using the corresponding HARQ process ID, the retransmission of the PUSCH applied with a different redundancy version with respect to the first transmission of the PUSCH. Upon receiving the second transmission of the PUSCH with a different redundancy version, the gNB may combine the two PUSCHs appropriately for the decoding of the PUSCH. The diversity provided by the different channels for the two transmissions provides an improved SNR for the channel decoding.

Antenna Ports, DMRS Ports, Precoding and Number of Layers

Different types of antenna ports are defined at the UE for PUSCH transmission. The DMRS ports at the UE are used to indicate the mapping of the data stream into data layers for the transmission, i.e., the number of DMRS ports used for a transmission denotes the spatial layers used for the transmission. The DMRS ports used for a PUSCH transmission are indicated by the 'Antenna ports' field in the scheduling DCI. The symbols in the DMRS resource elements corresponding to different ports can be code division multiplexed (CDM-ed). Each port belongs to a certain code-division-multiplexing group (CDM group) as specified in [1-4]. From the DMRS ports, the data layers are mapped to antenna ports (or SRS ports) by means of a precoder from which the PUSCH is transmitted.

Codebook and non-codebook PUSCH transmissions: When a 'codebook' or 'nonCodebook' PUSCH is scheduled using DCI format 0_1 or a higher layer grant, i.e., the higher layer parameter 'txConfig' is set to 'codebook' or 'nonCodebook', the UE may transmit the PUSCH using one or more antenna ports. The antenna ports are indicated for codebook and non-codebook-based PUSCH by means of the SRI that indicates one or more SRS resources associated with a 'codebook' or 'nonCodebook' SRS resource set. The SRS ports associated with the indicated SRS resource(s) is/are the antenna ports that the data layers (data streams at the DMRS ports) are mapped to. Depending on the mode of PUSCH transmission, the precoding scheme is either explicitly indicated or implicitly determined [1-4]—for codebook-based-PUSCH, the precoding scheme is explicitly indicated by the 'precoding and number of layers field' (the indicated precoding matrix F is of size P×L and it maps the data stream from L DMRS ports to P antenna ports) and for non-codebook-based-PUSCH the precoding scheme is not indicated and it is therefore, either predetermined or left to UE implementation [1-4]. In this disclosure, the term 'DMRS ports' denote the ports where the data (coded, rate-matched and modulated symbols, i.e., the modulated codeword) is mapped into layers and the terms 'antenna ports' or 'SRS ports' denote the ports that the DMRS ports are mapped to via a precoding scheme. Single-port PUSCH transmissions: When the PUSCH is scheduled using DCI format 0_0, the UE uses a single antenna port, which is mapped to a single DMRS port (port 0) [4]. No precoder is indicated in this case and a single layer of the PUSCH is transmitted by the UE.

Transmit Power Control (TPC) Command

The transmit power control command is provided in the DCI scheduling the PUSCH. It provides the power ramping or downscaling that needs to be done for a PUSCH transmission relative to the previous PUSCH transmission(s) [3]. The power ramping or downscaling may be accumulated over each PUSCH transmission if the higher layer parameter 'tpc-Accumulation' is enabled. The gNB uses such power control to control the amount of interference, the UEs throughput, the link reliability, etc.

Spatial Relation and Pathloss Reference RS

In FR2 (frequency range 2—frequencies higher than 6 GHz) deployments, directive UL transmissions are required and hence beam direction is an important parameter to be indicated for PUSCH. The beam direction/spatial relation of the PUSCH is determined from the beam direction/spatial relation of an SRS or a PUCCH resource depending on the mode of PUSCH transmission:

Codebook- or non-codebook-based PUSCH transmission is indicated with an SRS resource. The UE sounds the UL channel with SRS resources (which are configured specifically for the codebook/non-codebook transmission mode) and the gNB, in return, schedules the PUSCH via the indication of an SRS resource. The UE, thereby, transmits the PUSCH from the same ports from which the SRS resource was transmitted and uses the same beam direction/spatial relation for the transmission of the PUSCH as for the transmission of the SRS resource.

When the UE is scheduled by DCI format 0_0 (single-port PUSCH), the spatial relation used for the transmission of the PUSCH is the same as that used for the transmission of the PUCCH resource with the lowest ID in the currently active UL bandwidth part (BWP).

The pathloss reference RS, which is configured/indicated via a higher layer, is used in the power control settings of the PUSCH to determine the pathloss estimate for the transmission of the PUSCH [3]. The pathloss reference RS for the PUSCH is determined in different ways for different modes of PUSCH transmission. The PUSCH is configured with a list of pathloss reference RSs in 'PUSCH-PathlossReferenceRS' IEs and in most cases, it uses the list to obtain the pathloss reference RS.

For codebook- or non-codebook-based PUSCH transmission scheduled by the PDCCH, the pathloss reference RS is configured in 'SRI-PUSCH-PowerControl' IEs (shown in the higher layer configuration of power control parameters for PUSCH below). These IEs contain the power control settings for the PUSCH such as the ID of a PUSCH-pathlossReferenceRS, 'alpha' values (pathloss compensation factor) and the closed loop power control index. The mapping between the PUSCH-pathlossReferenceRS IEs and the SRI-PUSCH-PowerControl IEs can be modified using MAC-CE messages [3]. The SRS resource indicator mentioned for the codebook/non-codebook PUSCH transmission maps to a 'SRI-PUSCH-PowerControl' IE that provides these power control settings. When there is no SRI field in the scheduling PDCCH, the UE uses the SRI-PUSCH-PowerControl whose ID value is set to 0.

For single-port PUSCH (scheduled by the PDCCH via DCI format 0_0), the pathloss reference RS is obtained from the same PUCCH resource that it obtains the spatial relation from.

When the PUSCH is scheduled by a higher layer grant, the pathloss reference RS to be used is indicated via a path a lossReferenceIndex that points to a PUSCH-pathlossReferenceRS IE or is obtained from the SRI-PUSCH-PowerControl whose ID value is set to 0 when there is no SRI field.

The higher layer configuration of power control parameters for PUSCH [6] is shown in the following figure.

```
P0-PUSCH-AlphaSet ::=              SEQUENCE {
    p0-PUSCH-AlphaSetId                P0-PUSCH-AlphaSetId,
    p0                                 INTEGER (-16..15)
    alpha                              Alpha
}
P0-PUSCH-AlphaSetId ::=            INTEGER (0..maxNrofP0-PUSCH-AlphaSets-1)
PUSCH-PathlossReferenceRS ::=      SEQUENCE {
    pusch-PathlossReferenceRS-Id       PUSCH-PathlossReferenceRS-Id,
    referenceSignal                    CHOICE {
        ssb-Index                          SSB-Index,
        csi-RS-Index                       NZP-CSI-RS-ResourceId
    }
}
PUSCH-PathlossReferenceRS-Id ::    INTEGER (0..maxNrofPUSCH-PathlossReferenceRSs-1)
SRI-PUSCH-PowerControl ::=         SEQUENCE {
    sri-PUSCH-PowerControlId           SRI-PUSCH-PowerControlId,
    sri-PUSCH-PathlossReferenceRS-Id   PUSCH-PathlossReferenceRS-Id,
    sri-P0-PUSCH-AlphaSetId            P0-PUSCH-AlphaSetId,
    sri-PUSCH-ClosedLoopIndex          ENUMERATED { i0, i1 }
}
```

Transmit Power of PUSCH

The transmit power of PUSCH is determined from a combination of open loop and closed loop power control parameters. If the UE transmits a PUSCH on active UL BWP b of carrier f of serving cell c using parameter set configuration with index j and PUSCH power control adjustment state with index l, the UE determines the PUSCH transmission power in PUSCH transmission occasion i as $$P_{PUSCH,b,f,c}(i, j, q_d, l) =$$

$$\min \begin{Bmatrix} P_{CMAX,f,c}(i), \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{Bmatrix} [dBm]$$

where, $P_{CMAX,\,f,c}(i)$ is the configured maximum UE transmit power defined in [7] and [8], $P_{O\_PUSCH,b,f,c}(I)$ is a parameter composed of the sum of the nominal PUSCH transmission power $P_{O\_NOMINAL\_PUSCH,f,c}(j)$ and $P_{O\_UE\_PUSCH,b,f,c}(j)$ both of which are configured via a higher layer by the gNB [3], $M_{RB,b,f,c}^{PUSCH}(i)$ is the bandwidth of the PUSCH resource assignment expressed in number of resource blocks, $PL_{b,f,c}(q_d)$ is a downlink pathloss estimate in dB calculated by the UE using DL reference signal (RS) index $q_d$ (the configuration/indication of the pathloss reference RS is as described above), $\alpha_{b,f,c}(j)$ is a pathloss compensation factor configured via a higher layer by the gNB, and $f_{b,f,c}(i,l)$ is a closed loop power correction function that depends on the transmit power control (TPC) feedback from the gNB.

In 3GPP Rel. 16, multi-TRP transmissions that improve the reliability and robustness of PDSCH transmission(s) were standardized. Multiple PDSCHs that are transmitted from multiple TRPs carrying the same transport blocks (applied with the same or different redundancy versions) can be scheduled using a single PDCCH so that the UE can appropriately combine the data received from the different TRPs to improve the reliability of the PDSCH. The transmissions can be multiplexed in time domain, or frequency domain or space domain. The enabling and indication of each PDSCH multi-TRP reliability scheme is managed using a combination of higher layer and PHY-layer indication. However, the scheduling issues faced in the uplink are different from the ones in the downlink. This disclosure discusses the primary issues in uplink scheduling with respect to the specifications and then proceeds to provide a generic framework for reliability based PUSCH scheduling for single- and multi-TRP.

The 3GPP Rel. 16 specification describes procedures for multiplexing multiple downlink PDSCH transmissions scheduled by a single PDCCH [4]. However, the current specification does not describe such multiplexing methods for PUSCH that can be leveraged in multi-TRP scenarios.

SUMMARY

In view of the above drawbacks, it is an objective of the embodiments herein to provide at least methods and apparatuses for improving the robustness and performance of the PUSCH through improved transmission schemes and configurations thereof that apply in both single-TRP and multiple-TRP scenarios.

According to an aspect of some embodiments herein, there is provided a method performed by a UE, according to the subject matter disclosed herein.

According to another aspect of embodiments herein, there is provided a UE comprising a processor and a memory containing instructions executable by the processor, whereby said UE is to perform any of the subject matter disclosed herein.

There is also provided a computer program comprising instructions which when executed on at least one processor of the UE, cause the at least said processor to carry out the method according to the subject matter disclosed.

According to another aspect of some embodiments herein, there is provided a method performed by a network node, according to the subject matter disclosed herein.

According to another aspect of embodiments herein, there is provided a network node comprising a processor and a memory containing instructions executable by the processor, whereby said network node is configured to perform the subject matter disclosed.

There is also provided a computer program comprising instructions which when executed on at least one processor of the network node, cause the at least said processor to carry out the subject matter disclosed herein.

A carrier is also provided containing the computer program, wherein the carrier is one of a computer readable storage medium, an electronic signal, optical signal, or a radio signal.

An advantage of embodiment herein is to improve reliability and performance of the PUSCH in a multi-TRP scenario.

Another advantage with embodiments herein is to improve the scheduling of PUSCH transmissions.

Another advantage of some embodiments herein is to increase diversity of PUSCH transmission(s) using multiplexing schemes.

Additional advantages of the embodiments herein are provided in the detailed description of this disclosure.

BRIEF DESCRIPTION OF THE DRAWINGS

FIG. 1 illustrates an SRS resource set configuration (SoTA).

FIG. 2 shows an SRS resource configuration (SoTA).

DETAILED DESCRIPTION

Figure 3:
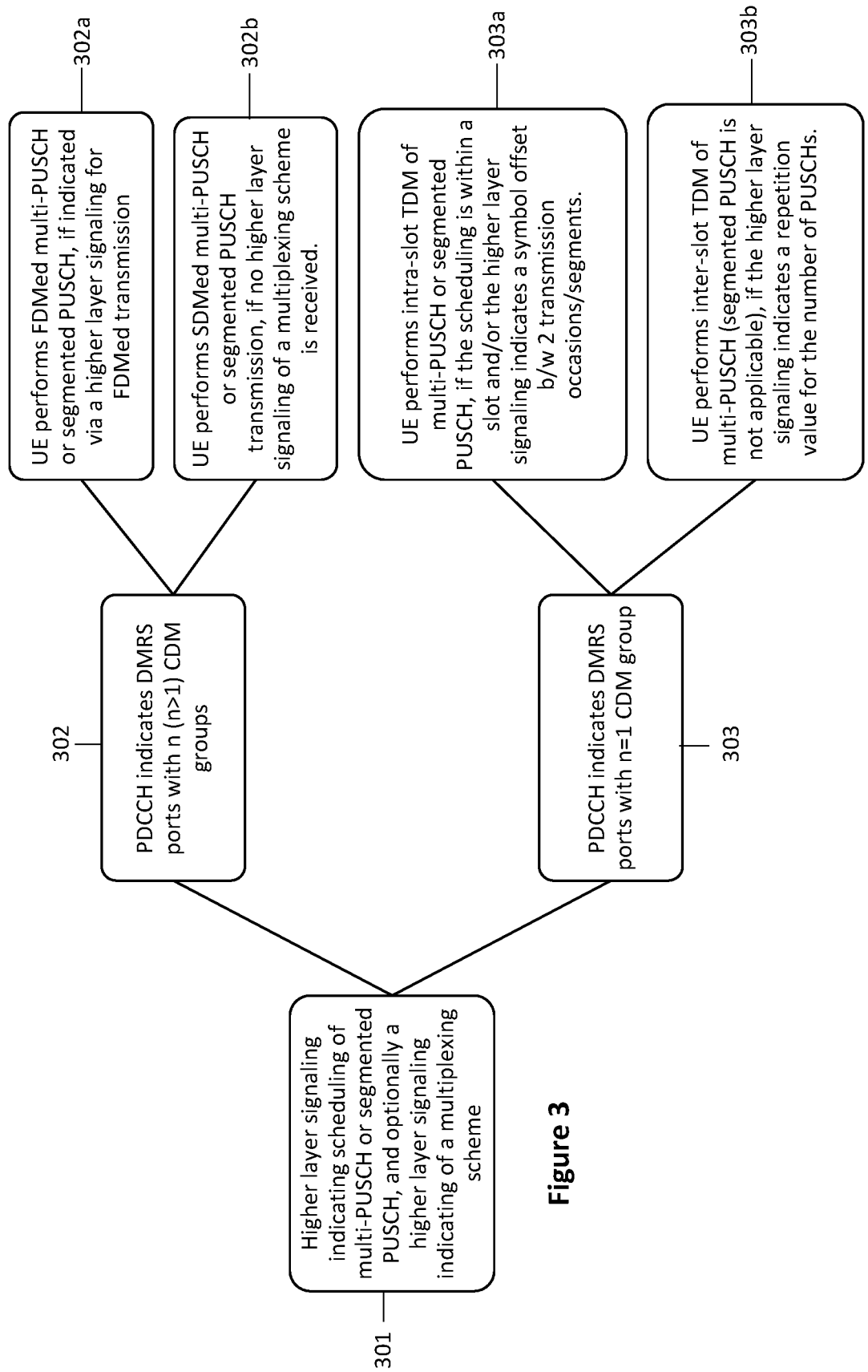
FIG. 3 depicts an example of a dynamic switching between multiplexing schemes according to some embodiments.

In the following, a detailed description of the exemplary embodiments is described in conjunction with the drawings, in several scenarios to enable easier understanding of the solution(s) described herein.

The transmission parameters involved in the scheduling of PUSCH transmissions were previously addressed. Solutions herein are provided in a context of scheduling multiple PUSCH transmissions or scheduling segmented transmissions of a single PUSCH, so that the scheduling can be implemented as deemed necessary in either single-TRP or multi-TRP scenarios.

The scheduling according to the embodiments herein is performed with a view to improve the reliability and robustness of the PUSCH. The transmission of the same PUSCH data to different TRPs may help in non-coherent combining of the PUSCH data, hence improving the overall SNR of the received PUSCH data. Various methods of PUSCH transmission in multi-TRP scenarios are discussed in this disclosure to provide flexibility in the scheduling.

The embodiments herein focus on transmission schemes and configuration thereof for one or more PUSCH transmissions scheduled by a single PDCCH or a higher layer grant. The PUSCH(s) scheduled may be transmitted to a single TRP or to multiple TRPs based on the transmission settings or transmission parameters used for each transmission. The objective of scheduling such transmissions is to improve one or more of the following metrics of the PUSCH: reliability, diversity and latency. Various issues concerning the scheduling of PUSCH for such purposes are addressed in this disclosure:

1) Indication of the scheduling of PUSCH (the number of PUSCHs scheduled, the resource allocation, etc.)
2) SRS and DMRS ports indication,
3) Redundancy version (RV),
4) Transmit power control (TPC),
5) Scheduling of one or a combination of multiplexing schemes-time division multiplexing (TDM) or frequency division multiplexing (FDM) or spatial division multiplexing (SDM)
6) PUSCH repetitions for reliability
7) Indication of transmission parameters of transmission settings with a TCI-state like setting in the UL Throughout the present disclosure, scheduling of n PUSCHs or n PUSCH transmissions via a single PDCCH or a single higher layer grant means that the PDCCH or the higher layer grant schedules n PUSCH transmission occasions or n PUSCH codewords that may be associated with the same or different transport blocks.

Configuration and Indication of Multiple PUSCH Transmissions or Segmented PUSCH Transmissions Improving the reliability, diversity and latency of PUSCH in a multi-TRP context may be performed using a combination of higher layer configuration and PHY-layer signaling. The UE may receive a scheduling request of multiple PUSCH transmissions or segmented PUSCH transmissions, wherein each PUSCH transmission or PUSCH segment is associated with different (one or more) transmission parameters of a transmission setting, wherein a transmission setting comprises a set of transmission parameters as will be described.

According to some embodiments herein, the UE is configured, by a network node (or gNB), to receive a single PDCCH/DCI or a higher layer grant that schedules one or more PUSCH transmission occasions, wherein:

if one PUSCH transmission occasion is scheduled, the UE may be scheduled to transmit at least two segments/parts of the PUSCH, wherein for one segment at least one of the following transmission parameters associated with the segment is different from the corresponding parameter associated with at least one other segment(s)/part(s) of the PUSCH: DMRS port(s), antenna port(s), pathloss reference RS, TPC command(s), spatial relation, frequency domain resources, and time domain resources. Hence, each segment of the PUSCH is associated with a transmission setting comprising a set of transmission parameters; and wherein at least one transmission parameter associated with one of the segments of the PUSCH is different from the corresponding transmission parameter associated with at least one other segment of the PUSCH.

if more than one PUSCH transmission occasion is scheduled, each PUSCH transmission occasion is associated with a transmitting setting comprising transmission parameters, wherein at least one transmission parameter associated with one of the PUSCH transmission occasions is different from the corresponding transmission parameter associated with at least one other PUSCH transmission occasion. The transmission parameters include: DMRS port(s), antenna port(s), pathloss reference RS for determining a pathloss estimated for a transmission, TPC command(s), spatial relation or beam direction, frequency domain resource(s), and time domain resource(s).

A segment of a PUSCH transmission occasion, or a segment of a PUSCH transmission, or a PUSCH segment, may be defined as a part of the associated PUSCH codeword wherein at least one of the following parameters of a transmission setting associated with the part or segment is distinct from at least one corresponding transmission parameter of at least one other part or segment of the same PUSCH codeword: antenna port(s), DMRS port(s), pathloss reference RS, TPC command, spatial relation, frequency domain resources, and time domain resources.

The transmission settings including the transmission parameters may be indicated in the PDCCH (or in a DCI) or in the higher layer grant. The UE may be notified via a higher layer that a PDCCH or a higher layer grant may schedule multiple PUSCH transmissions.

So, if one PUSCH transmission occasion is scheduled and the PDCCH (or the DCI) or the higher layer grant includes e.g. two transmission settings, this means that the UE is scheduled to transmit two segments of the PUSCH, each segment of the PUSCH is associated with a transmission setting as previously described.

In the case of PUSCH repetition described in the above embodiment, i.e., scheduling of multiple PUSCH transmission occasions, a special scheme of scheduling may be possible.

In accordance with embodiments, a single PDCCH/DCI or a higher layer grant schedules n>1 PUSCHs or PUSCH transmission occasions from a UE, wherein the same PUSCH transport block is scheduled to be transmitted n times by the UE as follows: n'<n of the n transmissions are scheduled with a first set of uplink transmission parameters, and the remaining n–n' uplink transmissions are scheduled with at least one uplink transmission parameter different from the corresponding transmission parameter from the first set of transmission parameters used for the other n' transmissions. For example, n'<n transmissions of the n transmissions may be scheduled with a first set of antenna ports, pathloss reference RS, TPC command, etc. The remaining n–n' transmissions are scheduled with a different set of antenna ports, pathloss reference RS and TPC command from the other n' transmissions. The order in which the first set of n' transmissions and the second set of n–n' transmissions are scheduled among the n total transmissions may be indicated by the gNB or a network node or fixed in the specifications. An example use-case for this method would be the repetitions of the same PUSCH TB towards two different TRPs. The first n' transmissions may be directed towards a first TRP and the rest n–n' transmissions may be directed towards a second TRP.

In the case of the segmented PUSCH transmissions, for example, the transmission parameter, spatial relation, in one transmitting setting associated with one segment of the PUSCH, is different from the corresponding transmission parameter, spatial relation, in the other transmission setting associated with the other segment of the same PUSCH. Therefore, the different segments of the same PUSCH are beamformed in different directions, wherein each direction may correspond to a specific TRP.

In accordance with an embodiment, the UE is configured to receive, from a gNB or a network node, a higher layer parameter indicating that the UE may receive a single PDCCH or a higher layer grant scheduling n (n≥1) PUSCH transmission occasion, or n (n≥1) PUSCH segments of a single PUSCH. For example, along with codebook and non-codebook PUSCH transmissions, a new transmission configuration of PUSCH transmission can be introduced in 'txConfig'. When the parameter 'txConfig' is set to 'multi-PUSCH', for instance, it indicates that the UE may receive a single PDCCH that schedules one or more PUSCH transmissions. In another example, the higher layer configuration of the PUSCH may comprise an additional parameter titled as 'enabledMultiPUSCHscheduling' that indicates the scheduling of one or more PUSCH transmissions using a single PDCCH or a higher layer grant.

In another method, the UE may expect a PDCCH to schedule multiple PUSCH transmission occasions, or multiple PUSCH segments of a single PUSCH, when the parameter 'txConfig' is not configured. In 3GPP Rel. 16, when the UE is not configured with the parameter 'txConfig', the UE does not expect to be scheduled with DCI format 0_1. In the following method, this scenario is exploited to schedule multiple PUSCH transmissions.

In accordance with an exemplary embodiment, the UE expects to receive a single PDCCH scheduling n (n≥1) PUSCH transmissions, or n (n≥1) PUSCH segments of a single PUSCH when the UE is not configured with the higher layer parameter 'txConfig'.

For example, the UE may receive a PDCCH using DCI format 0_1 or a newly introduced DCI format that schedules n PUSCH transmissions (n≥1), or n (n≥1) PUSCH segments of a single PUSCH, when the UE is not configured with the higher layer parameter 'txConfig'. By this method, the gNB may switch between multiple PUSCH scheduling via the aforementioned DCI format and single PUSCH scheduling via DCI format 0_0. Such a dynamic scheduling via the PHY-layer reduces significantly the latency compared to an indication of the single/multi-TRP PUSCH scheduling via higher layers. Moreover, it allows the gNB to adjust dynamically via the physical layer the scheduling of the PUSCH with respect to the channel condition between the UE and each TRP.

When the PDCCH or the higher layer grant schedules multiple PUSCH transmissions or segmented PUSCH transmissions, the multiplexing technique are indicated to the UE. There are different possibilities to transmit the PUSCH transmission occasion(s) to multiple TRPs. The following embodiments propose different multiplexing schemes that increase the reliability of PUSCH transmissions.

TDM-Based PUSCH Multiplexing

According to an embodiment, for the intra-slot TDM-based PUSCH scheduling, the network node is configured to schedule to the UE at least two PUSCH segments or at least two PUSCH transmission occasions wherein all PUSCH segments or all PUSCH transmission occasions are scheduled within the same slot, and each PUSCH segment or each PUSCH transmission occasion is scheduled in a set of symbol(s) that is/are distinct from the set of symbol(s) on which the other PUSCH segment(s) or PUSCH transmission occasion(s) are scheduled.

The different schemes related to the intra-slot TDM-based transmission are described below.

Scheme 1-1: Intra-Slot TDM-Based PUSCH Transmission According to an embodiment, the UE is configured to receive a single PDCCH or a higher layer grant scheduling n (n>1) PUSCH transmission occasions. The n PUSCH transmissions are time-division-multiplexed (TDMed) within the same slot, where the i-th PUSCH transmission is performed from symbol $a_i$ to symbol $b_i$ with $a_i \le b_i, \forall i$, $b_i < a_j \forall i < j$. The n PUSCH transmission occasions may be associated with the same or different PUSCH transport blocks. This type of TDM-based intra-slot scheduling of multiple PUSCH transmission occasions may be enabled via the configuration of a higher layer parameter to the UE. When the parameter is configured to the UE, the UE may expect to receive a single PDCCH that schedules n (n>1) PUSCH transmissions that are TDMed in the same (time) slot.

The intra-slot TDM scheme may increase the reliability of the transmission. For example, the UE may transmit the codeword associated with the same TB for the n PUSCH transmission occasions to n different TRPs which may combine the received codewords via a backhaul network. When the transmissions are performed to different TRPs, each PUSCH transmission may be associated with different transmission settings or parameters.

According to an exemplary embodiment, at least one of the following parameters associated with a PUSCH transmission may be different to the parameters associated with other PUSCH transmission(s) scheduled by a PDCCH or the higher layer grant: antenna port(s), DMRS port(s), transmit power control (TPC) command, pathloss reference RS, and spatial relation. This is used in the case of multi-TRP transmissions where different power control and/or beamforming settings are used for the transmissions to different TRPs.

Scheme 1-2: Intra-Slot TDM-Based PUSCH Transmission with TB Segmentation

In an exemplary embodiment, the UE is configured to receive a single PDCCH or a higher layer grant scheduling a single PUSCH transmission occasion, wherein the scheduled PUSCH transmission may comprise n (n>1) segments, wherein the i-th segment of the PUSCH is transmitted from symbol $a_i$ to symbol $b_i$ within a given slot, where $a_i \leq b_i \forall i$, $b_i < a_j \forall i < j$. This means that segments of a PUSCH transmission are TDMed into distinct sets of symbols within a slot. This method of intra-slot-based, TDM-based PUSCH transmission may be enabled, for example, via a higher layer signaling to the UE.

The different segments of a single PUSCH codeword may be transmitted to different TRPs, and hence each transmission may have different transmission settings. The individual segments are combined among the TRPs via the backhaul network. This kind of multiplexing scheme increases the diversity of the transmission. The intra-slot TDM-based PUSCH transmission with codeword segmentation may be enabled, for example, via a higher layer indication to the UE.

According to an exemplary embodiment, at least one of the following parameters associated with a segment of the PUSCH transmission may be different to the parameters associated with the other segment(s) of the same PUSCH transmission scheduled by a PDCCH or higher layer grant: antenna port(s), DMRS port(s), transmit power control (TPC) command, pathloss reference RS, and spatial relation. When different transmission settings are set for the different TDMed segments, each segment may be transmitted of to a different TRP.

Scheme 2-1: Inter-Slot TDM-Based PUSCH Transmission

For the inter-slot TDM-based transmission scenario, the network node is configured to schedule to the UE at least two different PUSCH transmission occasions wherein each PUSCH transmission occasion is scheduled in a different slot as described below.

According to an embodiment, the UE is configured to receive a single PDCCH or a higher layer grant scheduling n (n>1) PUSCH transmissions, where the i-th PUSCH transmission is performed from symbol $a_i$ to symbol $b_i$ in slot $p_i$, where $a_i \leq b_i \forall i$ and $p_i < p_j \forall i < j$. The n PUSCH transmission occasions may be associated with the same or different PUSCH transport blocks. This kind of inter-slot multi-TRP PUSCH transmission may be enabled, for example, via the configuration of a higher layer parameter to the UE. When the parameter is configured, the UE expects to receive a PDCCH that schedules n (n>1) PUSCH transmissions that are TDMed across multiple or different slots.

In the multi-TRP context, this inter-slot TDM scheme increases the reliability of the transmission when the codeword associated with the same TB is transmitted on the n scheduled PUSCH transmission occasions. Similar to the previous multiplexing techniques, the application of different transmission settings to each PUSCH transmission occasion is possible.

According to an exemplary embodiment, at least one of the following parameters associated with a PUSCH transmission scheduled by said PDCCH or higher layer grant may be different to the parameters associated with other PUSCH transmission(s) scheduled by a PDCCH or the higher layer grant: antenna port(s), DMRS port(s), transmit power control (TPC) command, pathloss reference RS, and spatial relation. This paves way for multi-TRP-based transmission of inter-slot TDMed PUSCH.

FDM-Based PUSCH Multiplexing

According to an embodiment, the network node is configured to schedule to the UE at least two PUSCH segments or at least two PUSCH transmission occasions, wherein a set of PRBs on which at least one PUSCH segment or PUSCH transmission occasion is scheduled, is partially or completely distinct from a set of PRBs on which one other PUSCH segment or one other PUSCH transmission occasion is scheduled. Below are described some embodiments related to the FDM-based PUSCH multiplexing scheme.

Scheme 3-1: FDM-Based PUSCH Transmission

According to an embodiment, the UE is configured to receive a single PDCCH or a higher layer grant scheduling n (n>1) PUSCH transmissions, where the i-th PUSCH transmission is performed on the PRBs $\Psi_i = \{a_{i,1}, \ldots a_{i,P}\}$ in a scheduled slot. The PRBs for the n PUSCH transmissions may partially overlap or not overlap, i.e., $\Psi_i \cap \Psi_j = \emptyset$, for some or all $i \neq j$, or $\Psi_i \cap \Psi_j = \emptyset \forall i \neq j$. All PUSCH transmissions may be performed from symbol $s_{start}$ to symbol $s_{end}$ in a scheduled slot. The n PUSCH transmission occasions may be associated with the same or different PUSCH transport blocks. This kind of frequency division multiplexing (FDM)-based multiple PUSCH transmission scheme may be enabled, for example, via the configuration of a higher layer parameter to the UE. When the parameter is configured, the UE may expect to receive a single PDCCH that schedules n (n>1) PUSCH transmissions that are FDMed in a given slot.

For example, the non-overlapped frequency allocation may be performed by dividing the available bandwidth for the PUSCH (or the UL BWP (Bandwidth Part) on which the PUSCH is transmitted) into equal parts for each PUSCH transmission. The parts allocated for each PUSCH may be contiguous or non-contiguous depending on a higher layer configuration or indication.

Different transmission settings may be applied for the PUSCH transmission occasions when transmitting the PUSCHs to different TRPs.

According to an exemplary embodiment, at least one of the following parameters associated with a PUSCH transmission may be different to the parameters associated with other PUSCH transmission(s) scheduled by a PDCCH or the higher layer grant: antenna port(s), DMRS port(s), transmit power control (TPC) command, pathloss reference RS, and spatial relation.

Scheme 3-2: FDM-Based PUSCH Transmission with TB Segmentation

According to an embodiment, the UE is configured to receive a PDCCH or a higher layer grant scheduling a single PUSCH transmission, wherein the scheduled PUSCH may comprise n (n>1) segments, wherein the i-th segment is transmitted on PRBs $\Psi_i = \{a_{i,1}, \ldots a_{i,P}\}$, and the PRBs for each part may partially overlap or not overlap (i.e. distinct), i.e., $\Psi_i \cap \Psi_j \neq \emptyset$, for some or all $i \neq j$, or $\Psi_i \cap \Psi_j = \emptyset \forall i \neq j$. All PUSCH transmissions may be performed from symbol $s_{start}$ to symbol $s_{end}$ in a scheduled slot. This diversity-based FDM-based transmission of a single PUSCH TB may be enabled by the gNB or network node, for example, via a higher layer configuration or indication to the UE.

For example, and as previously described, the non-overlapped frequency allocation may be performed by dividing the available bandwidth for the PUSCH (or the UL BWP on which the PUSCH is transmitted) into equal parts for the individual segments. The parts allocated for each segment may be contiguous or non-contiguous depending on higher layer signaling.

Similar to the previous methods, when the UE transmits each segment to a different TRP, different transmission parameters may be required per segment.

According to an exemplary embodiment, at least one of the following parameters associated with a segment of the PUSCH transmission may be different to the parameters associated with other segment(s) of the PUSCH transmission scheduled by a PDCCH or higher layer grant: antenna port(s), DMRS port(s), transmit power control (TPC) command, pathloss reference RS, and spatial relation.

SDM-Based PUSCH Multiplexing

In this scenario, the network node is configured to schedule to the UE at least two PUSCH transmission occasions or at least two PUSCH segments of a PUSCH transmission occasion wherein each PUSCH segment or each PUSCH transmission occasion is associated with a distinct set of DMRS ports and/or antenna ports as described in the following:

Scheme 4-1: SDM-Based PUSCH Transmission

According to an embodiment, the UE is configured to receive a PDCCH or a higher layer grant scheduling n (n>1) PUSCH transmissions, wherein each PUSCH transmission is performed on distinct antenna and/or DMRS port(s). All PUSCH transmissions may be associated with the same time and frequency domain resources in a scheduled slot. This method of spatially multiplexing of multiple PUSCH transmissions may be enabled, for example, via a higher layer configuration or higher layer parameter indicated to the UE. In an example, when n (n>1) PUSCH transmissions are scheduled, n'<n transmissions may be associated with the same set of antenna and/or DMRS port(s) while at least one of the remaining n−n' transmissions may be associated with a set of antenna or DMRS port(s) distinct from the aforementioned n' transmissions.

For example, two PUSCH transmissions that are Spatially-Division-Multiplexed (SDMed) may be scheduled via a PDCCH or a higher layer grant that indicates d DMRS ports and $a_1+a_2$ antenna ports, wherein a first set of $a_1$ antenna ports are associated with a first SRS resource or the reception of a first DL RS, and a second set of $a_2$ antenna ports distinct from the first set of antenna ports are associated with a second SRS resource or the reception of a second DL RS. An i-th PUSCH is transmitted using the i-th set of DMRS and antenna ports (the antenna port sets are determined based on the associated SRS resource or DL RS as mentioned above). The DMRS ports may be divided into sets according to the Code-Division-Multiplex (CDM) group the ports are associated with or with respect to the number of antenna ports used for the i-th PUSCH transmission. For instance, when 4 antenna ports and 3 DMRS ports are defined for 2 PUSCH transmissions, wherein the 3 DMRS ports can be grouped into two distinct CDM groups (e.g., three ports $p_0$, $p_1$, $p_2$ are indicated where ports $p_0$ and $p_1$ belong to CDM group 0 and port $p_2$ belongs to CDM group 1), the $1^{st}$ PUSCH is transmitted using the first 2 antenna ports and the DMRS ports $p_0$, $p_1$ and the $2^{nd}$ PUSCH is transmitted using the second 2 antenna ports and the DMRS port $p_2$. Each PUSCH, in the example, may be transmitted to a different TRP using the corresponding DMRS and antenna port(s).

A reliability-based SDM may be performed when the n PUSCHs are scheduled to n different TRPs, wherein all the transmissions are associated with the same transport block (TB). Similar to other methods, the transmission setting of each PUSCH may be different, for example, when transmitting each PUSCH to a different TRP.

According to an exemplary embodiment, at least one of the following parameters (or transmission settings) associated with a PUSCH transmission may be different to the parameters (or transmission settings) associated with the other PUSCH transmission(s) scheduled by the PDCCH or the higher layer grant: transmit power control (TPC) command, pathloss reference RS, and spatial relation.

Scheme 4-2: SDM-Based PUSCH Transmission with TB Segmentation

According to an embodiment, the UE is configured to receive a PDCCH or a higher layer grant scheduling a single PUSCH transmission, wherein the PUSCH may comprise n (n>1) segments, wherein each segment is transmitted using distinct antenna and/or DMRS port(s). All the segments of the said PUSCH transmission may be associated with the same time and frequency domain resources in a scheduled slot. The difference of this method to a conventional spatial multiplexing scheme is that at least one of the following parameters associated with a segment of the PUSCH transmission is different to the parameters associated with other segment(s) of the PUSCH transmission: transmit power control (TPC) command, pathloss reference RS, and spatial relation. In an example, when n (n>1) PUSCH segments are scheduled, n'<n segments may be associated with the same set of antenna and/or DMRS port(s) while at least one of the remaining n−n' segments may be associated with a set of antenna or DMRS port(s) distinct from the aforementioned n' segments.

For example, a segmented SDMed PUSCH transmission may be scheduled via a PDCCH or a higher layer grant indicating d DMRS and $a_1+a_2$ antenna ports, wherein a first set of $a_1$ antenna ports are associated with a first SRS resource or the reception of a first DL RS, a second set of $a_2$ antenna ports distinct from the first set of antenna ports are associated with a second SRS resource or the reception of a second DL RS. The i-th segment of the PUSCH is transmitted using the i-th set of DMRS and antenna ports (the antenna port sets are determined based on the associated SRS resource or DL RS as mentioned). The DMRS ports may be divided into sets according to the CDM group the (DMRS) ports are associated with or with respect to the number of antenna ports used for the i-th PUSCH segment. For instance, when 4 antenna ports and 3 DMRS ports are defined for 2 PUSCH segments, wherein the 3 DMRS ports can be grouped into two distinct CDM groups—the three ports $p_0$, $p_1$, $p_2$ are indicated where ports $p_0$ and $p_1$ belong to CDM group 0 and port $p_2$ belongs to CDM group 1—the $1^{st}$ PUSCH is transmitted on the first 2 antenna ports and DMRS ports $p_0$, $p_1$ and the $2^{nd}$ PUSCH is transmitted on the second 2 antenna ports DMRS port $p_2$. Each PUSCH segment, in the example, may be transmitted to a different TRP using the corresponding DMRS and antenna port(s).

The SDM-based PUSCH transmission scheme may be enabled via a higher layer configuration or indication to the UE.

Enabling of PUSCH Multiplexing Scheme

According to an embodiment, the multiplexing scheme (e.g., a TDM- or FDM- or SDM-based scheme, or a combination of the TDM- or FDM- or SDM-based scheme) may be configured or indicated to the UE via one or more higher layer parameters. This may be performed by either introducing one or more new higher layer parameters or reusing existing NR Release 16 higher layer parameter(s), e.g., the parameter 'txConfig' in the configuration of the PUSCH. For example, when a higher layer parameter is configured with 'multiPUSCHTDMintraSlotA' or 'multiPUSCHTDMintraSlotB', the UE expects a PDCCH or a higher layer grant that schedules a TDM-based intra-slot PUSCH transmission. Similarly, when the higher layer parameter is configured with 'multiPUSCHTDMinterSlot', the UE expects a PDCCH or a higher layer grant that schedules a TDM-based inter-slot PUSCH transmission. The other multiplexing schemes may likewise be indicated by configuring the higher layer parameter with 'multiPUSCHFDMSchemeA', 'multiPUSCHFDMSchemeB', 'multiPUSCHSDMSchemeA', or 'multiPUSCHSDMSchemeB'. It may also be possible to indicate a combination of two or more multiplexing schemes. With such an indication, the UE may use an appropriate combination of the methods described above. For example, the UE may be indicated via a higher layer that the UE may transmit multiple PUSCHs or PUSCH segments that are multiplexed both in time and space.

Antenna Port Indication for PUSCH Multiplexing

The following embodiments discuss the antenna port indication for the previously described multiplexing schemes when the network node schedules one or more PUSCH transmissions to the UE.

According to an embodiment, the UE is configured, by the gNB, to receive a PDCCH or a higher layer grant that schedules n (n>1) PUSCH transmissions using one of the multiplexing schemes proposed above. The single PDCCH or the higher layer grant indicates n different SRS resources, wherein each SRS resource may be associated with a PUSCH transmission occasion. Each PUSCH transmission occasion is carried out by the UE using the SRS port(s) which are associated with the corresponding SRS resource. The n SRS resources may be indicated via the SRS resource indicator, SRI field or a new field in the scheduling PDCCH or higher layer grant. The n SRS resources may be associated with the same SRS resource set or with different SRS resource sets. A special case of this method is the indication of up to n SRS resources. In a first example, a single PDCCH or higher layer grant may indicate 1<n'≤n different SRS resources wherein each PUSCH transmission occasion is associated with one of the n' SRS resources. When n'≤n, a single SRS resource may be associated with more than one PUSCH transmission occasion. In a second example, a single PDCCH or higher layer grant may indicate 1<n'≤n groups of SRS resources, wherein each group comprises one or more SRS resources and wherein each PUSCH transmission occasion is associated with one of the groups of one or more SRS resources. When n'<n, a group of SRS resources may be associated with more than one PUSCH transmission occasion. Here, each group of SRS resources may belong to a different SRS resource set. In a special case, the SRS resources may be indicated via one or more SRI fields.

For example, when two PUSCH transmission occasions of a PUSCH are scheduled via a PDCCH that indicates two SRS resources, where the first and second SRS resources are associated with antenna port(s) $p_{1,0}, \ldots, p_{1,R_1}$ and $p_{2,0}, \ldots, p_{2,R_2}$, respectively, the first PUSCH occasion is transmitted using the ports $p_{1,0}, \ldots, p_{1,R_1}$ (which are associated with the first SRS resource) and the second PUSCH occasion is transmitted using the ports $p_{2,0}, \ldots, p_{2,R_2}$ (which are associated with the second SRS resource).

A diversity-based PUSCH transmission may be configured/indicated as follows:

According to an embodiment, the UE is configured to receive a PDCCH or a higher layer grant scheduling a single PUSCH transmission occasion along with an indication of n (n>1) SRS resources, wherein the indication of the SRS resources may be performed using the SRS resource indicator field or a new field in the scheduling PDCCH or higher layer grant. The transmission of the i-th PUSCH segment is performed using the SRS ports associated with the i-th SRS resource indicated via the scheduling PDCCH or higher layer grant. The UE may be configured with previously described scheme (1-2) or with scheme (3-2), or with scheme (4-2).

For example, when a PUSCH is scheduled via a PDCCH that indicates two SRS resources, where the first and second SRS resources are associated with antenna port(s) $p_{1,0}, \ldots, p_{1,R_1}$ and $p_{2,0}, \ldots, p_{2,R_2}$, respectively, a first PUSCH segment is transmitted using the ports $p_{1,0}, \ldots, p_{1,R_1}$ (which are associated with the first SRS resource) and a second PUSCH segment is transmitted using the ports $p_{2,0}, \ldots, p_{2,R_2}$ (which are associated with the second SRS resource).

In another method, all the PUSCH transmissions (segmented or complete PUSCH transmission occasions) may be performed via the antenna ports associated with a single SRS resource.

According to an embodiment, the UE is configured to receive a single PDCCH or a higher layer grant that schedules n (n≥1) PUSCH transmissions (segmented or complete PUSCH transmission occasions), and the PDCCH or the higher layer grant indicates only a single SRS resource. All PUSCH transmissions are performed on the same antenna port(s) corresponding to the SRS port(s) associated with the indicated SRS resource.

Such a scheduling may occur to UEs that are equipped with only a single antenna port, or to UEs where only a single SRS resource is configured in the associated SRS resource set. It may also be desirable from the scheduler's perspective to provide the option of multiplexing the PUSCH(s) in time/frequency/space within a desired set of antenna port(s), wherein all the port(s) may be associated with the same resource.

Instructions may also be included in the scheduling PDCCH or higher layer grant for UEs with limitations in terms of the antenna ports the UE is equipped with or the number of SRS resources or SRS resource sets that the UE can be configured with (the UE capability may restrict the higher layer configuration it may receive regarding SRS). The following embodiments provide the concerned restrictions.

According to an exemplary embodiment, when the UE receives a single PDCCH or a higher layer grant that schedules n (n≥1) PUSCH transmissions (segmented or complete PUSCH transmission occasions), the UE expects that the scheduling PDCCH or higher layer grant does not indicate an SRS resource. The SRS resource is either a priori known to the UE, i.e., the UE uses a default SRS resource which is defined in specification, or there is only SRS resource configured via a higher layer to the UE in the SRS resource set associated with the scheduling PDCCH or higher layer grant. The SRS resource set associated with a PUSCH scheduling PDCCH or higher layer grant is the one that is used in sounding the UL channel, most recently before the reception of the PDCCH or the higher layer grant scheduling the PUSCH(s) (the usage parameter may have to match with the corresponding PUSCH transmission configuration).

According to an exemplary embodiment, the UE does not expect to receive a single PDCCH or single higher layer grant indicating SRS resource(s) for the PUSCH transmission(s) scheduled when the UE is configured with only one SRS resource in the SRS resource set associated with the scheduling PDCCH or higher layer grant or with only one SRS port.

According to another exemplary embodiment, if one or more SRS resource set(s) are associated with the PDCCH or higher layer grant scheduling the PUSCH transmission occasion(s) or if one or more SRS resource set(s) are associated with any of the PUSCH transmission occasion(s), the UE does not expect to be provided with one or more indicator(s) or one or more field(s) indicating in the scheduling PDCCH or higher layer grant an SRS resource from an associated SRS resource set that comprises just one SRS resource.

With such a restriction regarding the scheduling of the PUSCH, not all of the above multiplexing techniques may be applicable. For example, with single port UEs or UEs that may be configured with only one SRS resource configuration via a higher layer, only FDM- or TDM-based multiple PUSCH transmissions may be possible. Spatially multiplexing multiple PUSCH transmissions may not be possible, as the UE does not have a sufficient number of antenna ports or SRS resources to be indicated with.

The restrictions proposed above in the scheduling PDCCH or higher layer grant for UEs with limitations in terms of the antenna ports the UE is equipped with or the number of SRS resources or SRS resources sets that the UE can be configured with (the UE capability may restrict the higher layer configuration it may receive regarding SRS).

Uplink Transmission Configuration Indication for PUSCH Multiplexing

In the following, a framework for the indication of spatial relation, antenna ports and pathloss reference RS for one or more PUSCH transmissions based on an uplink-transmission configuration indication (UL-TCI) state framework is proposed. An UL TCI state, similar to the DL counterpart, may indicate the configuration for an uplink transmission comprising at least one of the following transmission parameters to be used for one or more PUSCH transmission(s): DMRS port(s), antenna port(s), spatial relation, and pathloss reference RS. The antenna or DMRS port(s) may be indicated in the UL-TCI via a reference signal or a channel resource in the UL or DL. The UL-TCI, in addition to the above parameters, may also provide one or more power control parameters such as alpha, p0 or closed-loop power control index.

For example, when the UL-TCI-state indicates a DL RS (a CSI-RS or an SSB) or a DL channel (a CORESET) as a reference, then the UE shall use the antenna ports used for the reception of the said DL RS or DL channel for the transmission of the PUSCH. Similarly, when the UL-TCI-state comprises an UL RS (an SRS) or an UL channel (PUCCH resource) as a reference, then the UE shall use the antenna ports used for the transmission of the said UL RS or UL channel for the transmission of the PUSCH. Therefore, a mention of "antenna port(s) indicated by an UL-TCI-state" in the present disclosure refers to the antenna ports associated with a transmission or reception of the RS or channel resource indicated by the UL-TCI-state. Likewise, the UL-TCI-state may indicate the pathloss reference or spatial relation for an UL transmission using DL or UL reference signals and/or channel resources.

The UL TCI-states may be configured to the UE, and optionally, down-selected via a higher layer and indicated via the PDCCH. Hence, the PDCCH may comprise an UL-TCI-state indication field (in e.g. the DCI) to schedule one or more PUSCH transmission(s). The UL-TCI-state, as a standalone or along with an SRI-based port indication, may be used in the scheduling of the PUSCH transmissions.

According to an embodiment, the UE is configured to receive a single PDCCH that schedules n (n>1) PUSCH transmissions (segmented or complete PUSCH transmission occasions), wherein the scheduling PDCCH comprises an UL-TCI field (in the DCI), where each codepoint of the field maps to up to n UL-TCI-states, and wherein each UL-TCI-state indicates at least one of the following transmission parameters: DMRS port(s), antenna port(s), spatial relation, and pathloss reference RS. This means a first UL-TCI state indicated by the codepoint may be associated with a first PUSCH transmission, a second UL-TCI state indicated by the codepoint may be associated with a second PUSCH transmission, and so on. Each PUSCH transmission is performed using the transmission setting indicated in the associated UL-TCI-state.

A similar parameter may be introduced in a higher layer grant that schedules multiple PUSCH transmissions.

According to an embodiment, the UE is configured to receive a higher layer grant that schedules n (n>1) PUSCH transmissions (segmented or complete PUSCH transmission occasions), wherein a parameter in the configuration indicates up to n UL-TCI-states and wherein each UL-TCI-state indicates at least one of the following transmission parameters: DMRS port(s), antenna port(s), spatial relation, and pathloss reference RS. This means a first UL-TCI state indicated by the codepoint may be associated with a first PUSCH transmission, a second UL-TCI state indicated by the codepoint may be associated with a second PUSCH transmission, and so on.

In an alternative, the antenna port(s) to be applied for each PUSCH transmission may be indicated by the SRS resource indicator field (in the DCI or the higher layer grant) instead of the UL-TCI-state field. For example, a PDCCH or higher layer grant that schedules n PUSCH transmissions may indicate the antenna port(s) to be used for each PUSCH transmission by indicating up to n SRS resources via the SRI field in the DCI or the higher layer grant and the spatial relation(s) used for the n PUSCH transmissions may be indicated via the UL-TCI-field in the DCI or a higher layer parameter that indicates UL-TCI states. The SRI-field (the field in the DCI or the SRI parameter in the higher layer grant) may map to up to n SRS resources. This means that a first value of the SRI-field may be associated with a first group of $n_1 \leq n$ SRS resources, a second value of the SRI-field may be associated with a second group of $n_2 \leq n$ SRS resources, and so on. The antenna port(s) indicated by an SRS resource provided by the SRI field or a codepoint of the SRI field may be used for the transmission of the PUSCH in at least one of the n scheduled PUSCH occasions. This means that, when the number of indicated SRS resources is less than n, more than one PUSCH transmission occasions may be associated with an SRS resource.

In a different example, a PDCCH or higher layer grant that schedules n PUSCH transmissions may indicate $\Sigma_{i=1}^{n'} n_i$ SRS resources. The indication may be provided by $1 \leq n' \leq n$ SRS resource indicator fields. A codepoint of an i-th SRI field may indicate upto $n_{i,max} \geq n_i$ SRS resources or up to n' groups of SRS resources with one or more resources in each group. The antenna ports indicated by a given SRI field (i.e., the SRS port(s) associated with the SRS resources indicated via the SRI field) or a given group of SRS resources (i.e., the SRS port(s) associated with the SRS resources) may be associated with the transmission of PUSCH in at least one of the n scheduled PUSCH occasions. When n'<n, the antenna ports indicated by a given SRI field (i.e., the SRS port(s) associated with the SRS resources indicated via the SRI field) or a given group of SRS resources (i.e., the SRS port(s) associated with the SRS resources) may be used for the transmission of the PUSCH on more than one of the scheduled occasions.

In an alternative, a PDCCH or a higher layer grant that schedules n PUSCH transmissions (segmented or complete PUSCH transmission occasions) may indicate both the antenna port(s) and the spatial relation(s) to be used for the n PUSCH transmissions via the UL-TCI-field in the DCI or a parameter in the configuration of the higher layer grant that indicates the UL-TCI-states. The codepoints of the UL-TCI field in the DCI or the value of the parameter in the configuration of the higher layer grant may indicate/map up to n UL-TCI-states, wherein each UL-TCI-state indicates the port(s) and the spatial relation(s) to be used for the corresponding PUSCH transmission. This means that a first codepoint of said DCI field or a first value of said higher layer parameter may be associated with a first group of $n_1 \leq n$ UL-TCI-states and $n_1 \leq n$ SRS resources, a second codepoint of said DCI field or a second value of said higher layer parameter may be associated with a second group of $n_2 \leq n$ UL-TCI-states and $n_2 \leq n$ SRS resources, and so on.

The transmission of the i-th PUSCH is performed via the antenna ports associated with the i-th SRS resource indicated by the SRI field or the antenna ports indicated by the i-th UL-TCI-state indicated by the UL-TCI field in the scheduling DCI.

A diversity-based PUSCH transmission may be configured/indicated as follows using the above UL-TCI-state approach.

According to an embodiment, the UE is configured to receive a PDCCH or a higher layer grant scheduling a single PUSCH transmission occasion along with an indication of n (n>1) different UL-TCI states, wherein the i-th UL-TCI-state is associated with an i-th segment of the scheduled PUSCH. The UE performs the transmission of the i-th segment of the PUSCH with the transmission configuration indicated in the i-th UL-TCI-state indicated via the scheduling PDCCH or higher layer grant. The UE may be configured with previously described scheme (1-2) or scheme (3-2) or scheme (4-2). The alternatives described above for the indication of the spatial relation and the antenna ports with various combinations of the SRI and the UL-TCI-state indications are also applicable for the case when n (n>1) PUSCH segments are scheduled instead of n PUSCH transmissions.

Indication of DMRS Ports for Multiple PUSCH Transmissions

The following embodiments describe the DMRS port indication which is required for the layer mapping of the PUSCH transmissions. Different examples for the DMRS and antenna port indication and mapping are presented in the following embodiments for multiple PUSCH and/or segmented PUSCH transmissions.

According to an embodiment, the UE is indicated, via a PDCCH or a higher layer grant for PUSCH, with p (p≥1) DMRS port(s) and q (q≥1) antenna (SRS) port(s), wherein the DMRS port(s) are grouped into m≤p code division multiplexed (CDMed) DMRS port group(s) for n (n≥1) PUSCH transmission(s) (segmented or complete PUSCH transmission occasions).

The antenna port(s) to be used for the transmission(s) may be indicated via (a) the SRS resource indicator field in the PDCCH or the higher layer grant that may indicate up to 1≤q SRS resource(s), or (b) a DCI field or a higher layer parameter that indicates up to 1≤q UL-TCI-state(s).

Depending on the indication of the antenna ports, the CDM groups of the indicated DMRS ports and various other criteria the mapping between the DMRS ports and the antenna ports may be determined.

Single-Port Transmission

According to an embodiment, the UE is configured to receive a PDCCH or a higher layer grant indicating p DMRS port(s) and q=p antenna port(s) for n (n≥1) PUSCH transmission(s) (segmented or complete PUSCH transmission occasions), wherein the q antenna port(s) are indicated via an SRS resource indicator field (SRI) present in the DCI or the higher layer grant scheduling the PUSCH(s). The antenna port(s) are associated with the q SRS resource(s) indicated using the SRI field, wherein each SRS resource is configured with one SRS port. A one-to-one mapping between antenna port(s) and DM-RS port(s) can therefore be performed. When the DMRS and antenna ports are indicated for n>1 PUSCH transmission occasions and n=p, each PUSCH is transmitted using a single DM-RS port and the associated antenna port. When the DMRS and antenna ports are indicated for a single n=1 PUSCH transmission occasion, and q>1 ports are indicated via q SRS resources, q segments of PUSCH are transmitted by the UE, each segment is transmitted using a single DM-RS port and an associated antenna port.

According to another embodiment, the UE is configured to receive a PDCCH or a higher layer grant indicating p DMRS ports and q=p antenna ports for n=p PUSCH transmissions (segmented or complete PUSCH transmission occasions), wherein the q antenna ports are indicated via a field that indicates up to n UL-TCI-states in the DCI or the higher layer grant. The antenna ports are associated with the n UL-TCI-states indicated via the scheduling PDCCH or higher layer grant, wherein each UL-TCI-state indicates one antenna port. A one-to-one mapping between antenna ports and DM-RS ports can therefore be performed. When the DMRS and antenna ports are indicated for n>1 PUSCH transmission occasions, each PUSCH is transmitted using a single DM-RS and associated antenna port. When the DMRS and antenna ports are indicated for a single n=1 PUSCH transmission occasion and q>1 ports are indicated via q SRS resources, q segments of PUSCH are transmitted by the UE, each using a single DM-RS port and an associated antenna port.

Single/Multi-Port Transmission

According to an embodiment, the UE is indicated with p DMRS port(s) belonging to m (m≥1) CDM group(s) and q antenna port(s), wherein the q antenna port(s) are associated with l=m SRS resource(s), and the l SRS resource(s) are indicated via an SRS resource indicator field (SRI) present in the DCI or the higher layer grant scheduling the PUSCH(s). The DMRS port(s) associated with the i-th CDM group are mapped with the antenna port(s) corresponding to the SRS port(s) associated with the i-th SRS resource indicated.

When the DMRS and antenna port(s) are indicated for n>1 PUSCH transmission occasions and n=m, the i-th PUSCH is transmitted using the DMRS port(s) corresponding to the i-th CDM group and the antenna ports associated with the i-th SRS resource indicated. When the DMRS and antenna port(s) are indicated for n=1 PUSCH transmission occasion, and l segment(s) of the PUSCH are transmitted where l=m, the i-th PUSCH segment is transmitted using the DMRS port(s) corresponding to the i-th CDM group and the antenna port(s) associated with the i-th SRS resource.

According to another embodiment, the UE is indicated with p DMRS port(s) belonging to m (m≥1) CDM group(s) and q antenna port(s), wherein the q antenna port(s) are associated with l=m UL-TCI-state(s) and the l UL-TCI-state(s) are indicated via a field that indicates up to l UL-TCI-state(s) in the DCI or the higher layer grant scheduling the PUSCH(s). The DMRS port(s) associated with the i-th CDM group are mapped with the antenna port(s) corresponding to the antenna port(s) associated with the i-th UL-TCI-state indicated.

When the DMRS and antenna port(s) are indicated for n>1 PUSCH transmission occasions and n=m, the i-th PUSCH is transmitted using the DMRS port(s) corresponding to the i-th CDM group and the antenna ports associated with the i-th UL-TCI-state. When the DMRS and antenna port(s) are indicated for n=1 PUSCH transmission occasion and l segments of PUSCH are transmitted where l=m, the i-th PUSCH segment is transmitted using the DMRS port(s) corresponding to the i-th CDM group and the antenna port(s) associated with the i-th UL-TCI-state.

The above methods may be used to schedule PUSCH transmissions using any of the multiplexing techniques (TDM, FDM or SDM) discussed before.

According to another embodiment, the UE is configured to receive a single PDCCH, or configured with a higher layer grant, scheduling n (n≥1) PUSCH transmission occasions, wherein the UE is configured to receive an indication of m DMRS ports (m≥1) and to perform each PUSCH transmission using the m indicated DMRS ports, i.e., the same set of DMRS ports are used for the transmission of all the n PUSCH transmissions. Depending on the number of PUSCH transmission scheduled and/or the antenna port indication, the DMRS and antenna port mapping may be determined. This means that all the PUSCH transmissions have the same number of data layers or streams.

When n>1 PUSCH transmissions are scheduled and q antenna port(s) are indicated via a SRI field or a UL-TCI-state indication field in the scheduling PDCCH or higher layer grant that indicate up to l=n SRS resources or UL-TCI-states respectively, each PUSCH transmission is performed using the same set of m indicated DMRS ports and the antenna ports associated with the i-th SRS resource or i-th UL-TCI-state.

When n=1 PUSCH transmission is scheduled and q antenna port(s) are indicated via a SRI field or a UL-TCI-state indication field in the scheduling PDCCH or higher layer grant that indicate up to l>n SRS resources or UL-TCI-states respectively, the UE performs transmission of l segments of PUSCH, wherein each PUSCH segment is transmitted on the same set of m indicated DMRS ports and the antenna ports associated with the i-th SRS resource or i-th UL-TCI-state.

In the above method, only 1 DMRS port may be used for all the transmission occasions.

In the next embodiments, it is proposed that the UE may apply a precoding between the DMRS ports and the antenna/SRS ports.

According to an embodiment, when a UE is configured to perform one or more PUSCH transmission(s) or the transmission of one or more PUSCH segments via a single PDCCH or a higher layer grant, wherein a certain mapping between the DMRS and antenna ports is known to the UE for the PUSCH transmission(s), as described in one or more of the methods above, and wherein the scheduling PDCCH or higher layer grant does not provide the precoding vector or matrix to be applied for at least one of the scheduled PUSCH (or PUSCH segment) transmissions, the UE may apply a specified default precoder matrix or vector or the precoder matrix or vector may be left to the UE's implementation.

For example, when the number of DMRS ports and SRS ports is identical, the precoder matrix or vector to be used by the UE for the PUSCH transmission is given by an identity or a diagonal matrix, i.e., the precoding matrix or vector for the i-th PUSCH associated with x DMRS ports which are mapped to x antenna ports is given by:

$$F_i = \frac{1}{\sqrt{x}} I_x \text{ or } F_i = \begin{bmatrix} \alpha_1 & \cdots & 0 \\ \vdots & \ddots & \vdots \\ 0 & \cdots & \alpha_x \end{bmatrix},$$

where $$\sum_{i=1}^{x} |\alpha_i|^2 = 1.$$

x can take any suitable value such as any integer value. This example applies mostly in the case of non-codebook based PUSCH as the number of SRS/antenna ports associated with a PUSCH in that case is equal to number of layers of PUSCH transmitted, which in turn is equal to the number of DMRS ports. The SRS resources associated with a PUSCH transmission occasion in non-codebook case comprise just one SRS/antenna port per resource and the number of resources may also indicate the number of layers of PUSCH transmitted.

In another example, it may be specified that the precoding matrix or vector for said PUSCH transmission is obtained from one of the precoding matrices or vectors in the codebook for the given number of DMRS and antenna ports for said transmission.

According to another embodiment, the UE is configured to receive an indication of up to m≥n DMRS ports, p≥m antenna ports and n precoding matrices or vectors {$F_1, \ldots, F_n$} that map m DMRS ports to p antenna ports for n (n>1) PUSCH transmissions or n (n>1) segments of a single PUSCH transmission via a single PDCCH or via a higher layer grant, wherein the antenna ports are indicated via an SRS resource indicator field (SRI) present in the scheduling DCI or the higher layer grant, or via a field that indicates up to n UL-TCI-states in the scheduling DCI or the higher layer grant. The precoding matrices may be indicated by the network node via the Precoding and number of layers' field in the scheduling DCI or the higher layer grant, where the codepoint of the field in the DCI or the value of the parameter in the higher layer grant may indicate up to n precoding matrices. For example, the first precoding matrix is associated with a first PUSCH (or PUSCH segment) transmission, the second precoding matrix with a second PUSCH (or PUSCH segment) transmission, and so on. In another example, the precoding matrices may be indicated by the network node via the 'Precoding and number of layers' field in the scheduling DCI or the higher layer grant, where the field is split into multiple parts or partitions and each part provides a precoding matrix and each precoding matrix may be associated with at least one PUSCH transmission occasion or segment.

In an example scenario, a PDCCH or a higher layer grant may schedule two PUSCH transmissions, and it indicates the DMRS ports {$p_0$, $p_1$, $p_2$} along with four antenna ports (via the SRI or UL-TCI indication as mentioned above). The scheduling PDCCH or higher layer grant also indicates the precoders $$F_1 = \begin{bmatrix} a_{11} & a_{12} \\ a_{21} & a_{22} \end{bmatrix}$$

and $$F_2 = \begin{bmatrix} b_{11} \\ b_{21} \end{bmatrix}$$

for the two PUSCH transmissions. The first PUSCH is transmitted using DMRS ports $p_0$ and $p_1$ which are mapped to the first two SRS ports using the precoding matrix $F_1$, and the second PUSCH is transmitted using DMRS port $p_2$ which is mapped to the other two SRS ports using the precoding matrix $F_2$. In another example, a PDCCH or a higher layer grant may schedule one PUSCH transmission, and indicates the DMRS ports {$p_0$, $p_1$, $p_2$} along with four antenna ports (via the SRI or UL-TCI indication as mentioned above). The scheduling PDCCH or higher layer grant also indicates the precoders $$F_1 = \begin{bmatrix} a_{11} & a_{12} \\ a_{21} & a_{22} \end{bmatrix}$$

and $$F_2 = \begin{bmatrix} b_{11} \\ b_{21} \end{bmatrix}$$

for the PUSCH transmission. Two segments of the PUSCH are transmitted where the DMRS ports $p_0$ and $p_1$ are mapped to the first two SRS ports using the precoding matrix $F_1$ for the first segment, and the DMRS Port $p_2$ is mapped to the other two SRS ports using the precoding matrix $F_2$ for the second segment.

In the given example, the DMRS ports may be split among multiple PUSCH transmissions or multiple segments of a single PUSCH by considering the CDM groups of the DMRS ports indicated.

The above DMRS and antenna port indication methods may be combined with any of the multiplexing schemes described above to schedule a segmented PUSCH transmission or multiple PUSCH transmissions.

With the above port indication methods, it may be able to specify methods to dynamically switch between single-TRP and multi-TRP transmissions for codebook and non-codebook based PUSCH transmissions.

In accordance with some exemplary embodiments, the UE expects to receive a single PDCCH or a higher layer grant scheduling n (n≥1) PUSCH transmissions (multiple PUSCH transmissions or multiple segments of a single PUSCH transmission) when the UE is configured with the higher layer parameter 'txConfig' whose value is set to 'codebook' or 'nonCodebook'.

For example, the UE may receive a PDCCH using DCI format 0_1 or using a newly introduced DCI format or a higher layer grant that schedules n PUSCH transmissions (n≥1), when the UE is configured with 'codebook' or 'nonCodebook' for the higher layer parameter 'txConfig'. When the UE is configured with a codebook-based or non-codebook-based PUSCH, depending on the indication of one or more of the following parameters by the scheduling PDCCH or higher layer grant, the UE may transmit a single PUSCH without segmentation or perform segmented/multiple PUSCH transmissions: DMRS ports, antenna ports, precoding information, TPC commands. For instance, when the UE is indicated with 2 precoding matrices for a codebook-based PUSCH scheduling, the UE may perform segmented/multiple PUSCH transmission(s) and when the UE is indicated with 1 precoding matrix for a codebook-based PUSCH scheduling, the UE may perform a single unsegmented PUSCH transmission.

In another instance, when the UE is indicated with DMRS ports from multiple CDM groups for a non-codebook-based PUSCH scheduling, the UE may perform segmented/multiple PUSCH transmission(s) and when the UE is indicated with DMRS ports within the same CDM group for a non-codebook-based PUSCH scheduling, the UE may perform a single unsegmented PUSCH transmission. This method may pave the way for dynamic switching between codebook/non-codebook based single TRP and multi-TRP scheduling of PUSCH.

Indication of Power Control for Multiple PUSCH Transmissions

Another parameter of interest is the transmit power control command which provides the power ramping or deduction in the PUSCH transmission with respect to the previous transmissions. This is performed independently for each PUSCH transmission, which means that the scheduling PDCCH indicate as many TPC commands as the number of PUSCHs or PUSCH segments scheduled.

According to an embodiment, the UE is configured to receive a PDCCH or a higher layer grant scheduling n (n>1) PUSCH transmissions or a single PUSCH transmission with n (n>1) segments, wherein the scheduling PDCCH may indicate n TPC commands corresponding to the n PUSCH transmissions or n segments of a single PUSCH transmission. The scheduling PDCCH or higher layer grant may comprise a p-bit field, which may be the existing TPC command field or another field, whose codepoints map to up to n TPC commands for the n PUSCH transmissions or n PUSCH segments scheduled by the PDCCH. The mapping of the codepoints of said field to the n TPC commands may already be known to the UE (each codepoint is specified with the TPC commands they map to by default) or the mapping may be configured or indicated to the UE via a higher layer (e.g., MAC (Media Access Control), RRC (Radio Resource Control) signaling).

According to another embodiment, the TPC commands for multiple PUSCH transmissions (or segments of a PUSCH transmission) may be indicated via DCI format 2_2 which is exclusively used to indicate TPC commands for PUCCH or PUSCH.

According to an embodiment, the UE is configured to receive a PDCCH with DCI format 2_2 wherein the DCI indicates up to n (n>1) TPC commands. The field indicating the n TPC commands in the DCI may be the existing TPC command field or a new field. The indicated up to n TPC commands may be applied for up to n PUSCH transmissions, or n segments of a PUSCH transmission, that may be scheduled via a single PDCCH or a higher layer grant. The mapping of the codepoints of said field in the DCI to the n TPC commands may already be known to the UE (each codepoint is specified with the TPC commands they map to by default) or the mapping may be configured or indicated to the UE via a higher layer (e.g., MAC, RRC).

According to an exemplary embodiment, the field indicating the n (n>1) TPC commands in a DCI format may be extended from a p-bit field to an np-bit field where the i-th p-bit pattern indicates the TPC command for the i-th PUSCH transmission and the mapping of the p-bit pattern to the TPC command is specified and known to the UE. For example, the value of p may be equal to 2 and when the power ramping/downscaling is to be indicated for 2 PUSCH transmission(s), the DCI indication may be of size 4 bits and the first 2 bits indicate the TPC command for a first PUSCH transmission and the second 2 bits for a second PUSCH transmission, where the mapping of the 2 bits to a TPC command may be as per the specification in [2-3]. The np-bit field may comprise n separate fields with p bits in each field.

Indication of Miscellaneous Parameters for PUSCH Multiplexing

Redundancy Version

When multiple transmissions of the same PUSCH transport block is scheduled by a single PDCCH or a higher layer grant, the redundancy version with which each PUSCH transmission is associated with may be different. When the same PUSCH transport block is transmitted with varying redundancy versions, the receiver obtains different sets of the parity bits added by a channel encoder which provides diversity in the decoding of the PUSCH transport block, thereby improving the decoding performance. The indication of the redundancy version for the PUSCH may be performed using a combination of higher layer and PHY-layer signaling.

According to an embodiment, the UE is configured to receive a PDCCH or a higher layer grant scheduling n (n>1) PUSCH transmissions. Up to n redundancy versions (RVs) may be indicated for the n PUSCH transmissions. All the RV values may be indicated in the scheduling PDCCH or the higher layer grant. In an alternative, the RV values may be indicated via a combination of physical layer and higher layer signaling. Different schemes for the indication of the RVs are proposed in the following.

In one method, the RV for one of the PUSCH transmissions may be configured or indicated via a higher layer, and the RVs for the remaining PUSCH transmissions may be indicated via the RV indication field in the PDCCH or the higher layer grant, wherein the value of the RV field may map to specific RV offset value(s) (the difference in the RV from the indicated RV value) with respect to the RV of the first PUSCH transmission.

In another method, the RV for one of the PUSCH transmissions is indicated via the scheduling PDCCH or higher layer grant, and the redundancy version of the remaining PUSCH transmissions may be determined using one or more RV offset value(s) configured via a higher layer that indicate(s) the offset(s) of the RVs of the remaining PUSCH transmissions with respect to the one indicated via the scheduling PDCCH or higher layer grant. In an example, the RV of n'<n PUSCH transmissions scheduled by the PDCCH or higher layer grant may be provided via the scheduling PDCCH or higher layer grant and the RVs of the remaining n−n' transmissions may be determined based on the indicated RV value and/or one or more RV offset value(s) configured via a higher layer.

Gap Between Transmissions in TDMed PUSCH Transmissions

In the case of an intra-slot TDMed PUSCH transmissions (presented previously in scheme 1-1 and scheme 1-2), the indication of the symbols for the transmission of the PUSCHs may be performed with a combination of higher layer and PHY-layer signaling, when applicable. In one method, the symbols scheduled for one of the PUSCHs may be indicated and the scheduling of the rest of the PUSCHs may be determined using the offset of a PUSCH from the previous PUSCH transmission.

According to an embodiment, when the UE is scheduled via a PDCCH or a higher layer grant with n (n>1) PUSCH transmissions and all PUSCH transmissions are scheduled in the same slot on distinct time domain resources, the UE is configured to receive a higher layer parameter, from a network node or gNB, that indicates the number of symbols between two PUSCH transmission occasions, i.e., the offset of a PUSCH transmission from a previous PUSCH transmission in terms of the number of symbols. In the case the parameter is not configured when multiple PUSCH transmissions are scheduled within a slot, the UE may assume a default value for the number of symbols between two PUSCH transmissions. For example, when the parameter is not configured, the UE may assume that the number of symbols between any two PUSCH transmission occasions scheduled via a single PDCCH or higher layer grant is zero.

According to another embodiment, when the UE is scheduled via a PDCCH or a higher layer grant with n (n>1) segments of a PUSCH transmission and all segments are scheduled in the same slot on distinct time domain resources, the UE is configured to receive a higher layer parameter that indicates the number of symbols between two segments of the PUSCH transmission, i.e., the offset of a PUSCH segment from a previous PUSCH segment in terms of the number of symbols. In the case the parameter is not configured when multiple PUSCH transmissions are scheduled within a slot, the UE may assume a default value for the number of symbols between two PUSCH segments. For example, when the parameter is not configured, the UE may assume that the number of symbols between any two PUSCH segments scheduled via a single PDCCH or higher layer grant is zero.

Indication of a Number of PUSCH Transmissions, PUSCH Repetitions and Repetition Patterns The UE may determine the number of PUSCH transmissions scheduled via a PDCCH or a higher layer grant via explicit higher layer signaling or indirectly via the scheduling PDCCH or the higher layer grant.

According to an embodiment, the UE may be configured to receive, from the network node or gNB, an indication via a higher layer on the number of PUSCH transmissions or the number of segments of a PUSCH transmission that may be scheduled by a single PDCCH or a higher layer grant. On reception of the indication, the UE may expect a single PDCCH or a higher layer grant that schedules the indicated number of PUSCH transmission occasions or the indicated number of PUSCH segments. All scheduled PUSCH transmission occasions may be associated with the same PUSCH transport block or with different PUSCH transport blocks.

According to an embodiment, the number of PUSCH transmissions or the number of segments of a single PUSCH transmission scheduled via a PDCCH or a higher layer grant may be determined via the number of UL-TCI states or the number of SRS resources or the number of TPC commands or the number of CDM groups of the DMRS ports indicated to the UE.

For example, if the PDCCH or the higher layer grant indicates n UL-TCI-states, the UE is configured to perform the transmission of n PUSCH(s) or n segments of a single PUSCH wherein the i-th PUSCH transmission occasion or the i-th segment of the said single PUSCH is associated with the i-th indicated UL-TCI-state.

In another example, if the scheduling PDCCH or higher layer grant indicates n SRS resources (via the SRI field or any other field that indicates SRS resources) or n TPC commands or DMRS ports belonging to n CDM groups, the UE is configured to perform the transmission of n PUSCH(s) or n segments of a single PUSCH, wherein the i-th PUSCH transmission occasion or the i-th segment of the said single PUSCH is associated with the i-th indicated SRS resource or the i-th indicated TPC command or the DMRS ports belonging to the i-th CDM group. All the n PUSCH transmission(s) in this scenario may be associated with the same PUSCH transport block.

In another method, the number of RVs indicated may be used to determine the number of PUSCH transmission occasions or PUSCH segments scheduled.

According to another embodiment, the number of PUSCH transmissions or the number of segments of a single PUSCH transmission scheduled via a PDCCH or a higher layer grant may be determined via the number of RVs indicated in the scheduling PDCCH or higher layer grant or via a combination of the physical and higher layer signaling.

For example, when the UE is indicated with a single RV in the PDCCH that schedules the PUSCH and the RV offset values for 2 other PUSCH(s) are indicated via a higher layer to the UE, then the UE understands that it must perform 3 PUSCH transmissions in total.

The reliability of PUSCH may be improved by means of repetition of the PUSCH. In a multi-TRP context, the repetitions of a PUSCH transport block may be performed to different TRPs using a specified or indicated sequence/pattern. The following embodiments provide different methods for PUSCH repetitions.

According to an embodiment, when a PDCCH or higher layer grant that schedules a PUSCH transmission is received, wherein n−1 repetitions of the PUSCH transmission occasion are indicated via a higher layer, i.e., a total of n (n>1) PUSCH transmissions are to be performed, and the scheduling PDCCH or higher layer grant indicates p≤n UL-TCI states or p≤n SRS resources, the first UL-TCI state or SRS resource indicated via the scheduling PDCCH or higher layer grant is associated to $m_1$<n PUSCH transmission occasion(s) and a second UL-TCI state or SRS resource indicated is associated to $m_2$<n to PUSCH transmission occasion(s) and so on, and $m_1+m_2+ \ldots +m_p=n$. Each PUSCH transmission is performed using the transmission setting (which may include the antenna ports) provided in the associated UL-TCI-state or using the antenna/SRS ports corresponding to the associated SRS resource.

The mapping of the indicated SRS resources or UL-TCI-states with a PUSCH transmission occasion may be indicated via a higher layer signaling and/or a default mapping method is specified for the UE. This mapping affects the pattern in which the PUSCH transport block is transmitted to each TRP.

According to another embodiment, when the number of PUSCH repetitions configured to the UE is equal to the number of indicated UL-TCI states or SRS resources via the scheduling PDCCH or higher layer grant, the UL-TCI-states or SRS resources indicated may follow the order of the PUSCH transmission occasions, i.e., the first UL-TCI state or SRS resource is associated with the first PUSCH transmission occasion, the second UL-TCI state or SRS resource is associated with the second PUSCH transmission occasion, and so on. Each PUSCH transmission is performed using the transmission setting (which may include the antenna ports) provided in the associated UL-TCI-state or using the antenna/SRS ports corresponding to the associated SRS resource.

According to another embodiment, when the configured number of repetitions of a PUSCH transmission occasion is larger than the number of indicated UL-TCI states or SRS resources in the scheduling PDCCH or higher layer grant, the UE is configured to enable a specific pattern (e.g., configured via a higher layer) of the PUSCH transmission occasions. In one example, the pattern follows a cyclic mapping between the indicated UL-TCI states or the SRS resources and the PUSCH transmission occasions.

For example, when 2n transmissions of a PUSCH need to be performed and the scheduling PDCCH or higher layer grant indicates 2 UL-TCI-states or 2 SRS resources, the first UL-TCI-state or SRS resource is associated with the first PUSCH transmission occasion, the second UL-TCI-state or SRS resource is associated with the second transmission occasion and the same pattern of association is repeated with the remaining PUSCH transmission occasions (i.e., the first UL-TCI-state or SRS resource is associated with the third PUSCH transmission occasion, the second UL-TCI-state or SRS resource is associated with the fourth transmission occasion and so on). In one example, a repeated block pattern is used for the UL-TCI-state or SRS resource association. When 2n transmissions of a PUSCH need to be performed and the scheduling PDCCH or higher layer grant indicates 2 UL-TCI-states or 2 SRS resources, the first UL-TCI state or SRS resource is associated with the odd (1st, 3rd, . . . (2n−1)-th) PUSCH transmission occasions and the second TCI state is associated with the even (2nd, 4th, . . . (2n)-th) PUSCH transmission occasions. In an alternative, the UE may apply a specified pattern of association of the PUSCH transmission occasions with the indicated UL-TCI-states or SRS resources without any higher layer indication of the same, i.e., the pattern of association to be applied is fixed in the specification. In a second example, when 2n transmissions of a PUSCH need to be performed and the scheduling PDCCH or higher layer grant indicates 2 UL-TCI-states or 2 SRS resources, the first UL-TCI state or SRS resource is associated with the first and second PUSCH transmission occasions, the second UL-TCI state or SRS resource is associated with the third and fourth PUSCH transmission occasions, and the pattern is repeated for the rest of the PUSCH transmission occasions.

According to an embodiment, when the configured number of repetitions of a PUSCH transmission occasion is larger than the number of groups of SRS resources indicated in the scheduling PDCCH or higher layer grant, wherein each group comprises one or more SRS resources, the UE is configured to enable a specific pattern (e.g., configured via a higher layer) of the PUSCH transmission occasions. In one example, the pattern follows a cyclic mapping between the indicated the groups of SRS resources and the PUSCH transmission occasions.

In an example, when 2n transmissions of a PUSCH need to be performed and the scheduling PDCCH or higher layer grant indicates 2 groups of SRS resources, with each group comprising one or more SRS resources, the first group of SRS resource(s) is associated with the first PUSCH transmission occasion, the second group of SRS resource(s) is associated with the second transmission occasion and the same pattern of association is repeated with the remaining PUSCH transmission occasions (i.e., the first group of SRS resource(s) is associated with the third PUSCH transmission occasion, the second group of SRS resource(s) is associated with the fourth transmission occasion and so on). In a second example, a repeated block pattern is used. When 2n transmissions of a PUSCH need to be performed and the scheduling PDCCH or higher layer grant indicates 2 groups of SRS resources, with each group comprising one or more SRS resources, the first group of SRS resource(s) is associated with the odd (1st, 3rd, ... (2n−1)-th) PUSCH transmission occasions and the second group of SRS resource(s) is associated with the even (2nd, 4th, ... (2n)-th) PUSCH transmission occasions. In a third example, when 2n transmissions of a PUSCH need to be performed and the scheduling PDCCH or higher layer grant indicates 2 groups of SRS resources, with each group comprising one or more SRS resources, the first group of SRS resource(s) is associated with the first and second PUSCH transmission occasions, the second group of SRS resource(s) is associated with the third and fourth PUSCH transmission occasions, and the pattern is repeated for the rest of the transmission occasions. In an alternative, the UE may apply a specified pattern of association of the PUSCH transmission occasions without any higher layer indication of the same, i.e., the pattern of association to be applied is fixed in the specification. A point to note is that the said two groups of indicated SRS resources may be associated with two different SRS resource sets.

In the above embodiments, the UE is configured to use any of the above given patterns of application of the provided setting(s) (SRS resource(s), UL-TCI states, etc.) to the scheduled PUSCH transmission occasion(s) via a configuration or indication of said pattern provided by a network node via the PHY layer or a higher layer or due to a pre-determined behavior fixed in the specifications.

The mapping method indicated above may also be applied in the case when m<n TPC commands, TPMI values or redundancy versions are indicated for n PUSCH transmission occasions or n PUSCH segments.

According to another embodiment, when the configured or indicated or scheduled number of repetitions/transmissions/occasions of a PUSCH is larger than the number of indicated TPC commands, precoder indications (RI and/or TPMI, for example) or redundancy versions provided for said PUSCH transmission occasions, the UE is configured to enable a specific pattern (e.g., configured via a higher layer) of application of the TPC commands, TPMI values or redundancy versions for the PUSCH transmission occasions. In one example, the pattern follows a cyclic mapping between said parameter (TPC commands, precoder indications or the redundancy versions) to the PUSCH transmission occasions.

For example, when 2n transmissions of a PUSCH are scheduled by a PDCCH or higher layer grant and for those PUSCH transmission occasions 2 TPC commands/precoder indications/redundancy versions are provided, the first TPC command/precoder indication/redundancy version is associated with the first PUSCH transmission occasion, the second TPC command/precoder indication/redundancy version is associated with the second transmission occasion and the same pattern of association is repeated with the remaining PUSCH transmission occasions (i.e., the first TPC command/precoder indication/redundancy version is associated with the third PUSCH transmission occasion, the second TPC command/precoder indication/redundancy version is associated with the fourth transmission occasion and so on). In one example, a repeated block pattern is used for the TPC command/precoder indication/redundancy version association. When 2n transmissions of a PUSCH are scheduled by a PDCCH or a higher layer grant and 2 TPC commands/precoder indications/redundancy versions are provided, the first TPC command/precoder indication/redundancy version is associated with the odd (1st, 3rd, ... (2n−1)-th) PUSCH transmission occasions and the second TPC command/precoder indication/redundancy version is associated with the even (2nd, 4th, ... (2n)-th) PUSCH transmission occasions. In a second example, when 2n transmissions of a PUSCH are scheduled by a PDCCH or a higher layer grant and 2 TPC commands/precoder indications/redundancy versions are provided, the first TPC command/precoder indication/redundancy version is associated with the first and second PUSCH transmission occasions, the second TPC command/precoder indication/redundancy version is associated with the third and fourth PUSCH transmission occasions, and the pattern is repeated for the rest of the PUSCH transmission occasions. In an alternative, the UE may apply a specified pattern of association of the PUSCH transmission occasions with the indicated TPC command/precoder indication/redundancy version without any higher layer indication of the same.

In the above methods/example, the UE is configured to use any of the above given patterns of application of the provided setting(s) (RVs, precoding indication, TPC commands etc.) to the scheduled PUSCH transmission occasion(s) via a configuration or indication of said pattern provided by a network node via the PHY layer or a higher layer or due to a pre-determined behavior fixed in the specifications.

Another parameter of interest in the repetition of the PUSCH is the so-called start and length indication vector (SLIV). The SLIV is used to indicate the starting symbol and the number of symbols to be used for a PUSCH transmission in a slot.

According to an embodiment, when n PUSCH transmission occasions are scheduled to be transmitted in n different slots via a PDCCH or a higher layer grant, all the PUSCH transmission occasions may follow the same start and length indication vector. The SLIV may be indicated by the scheduling PDCCH or higher layer grant, or it is configured to the UE via a higher layer.

In all the methods/embodiments described above, the scheduling of n PUSCH transmissions (n>1) by a single PDCCH or a higher layer grant may be enabled via the indication of the repetition parameter. When a PUSCH transmission occasion is scheduled by a PDCCH or a higher layer grant and a repetition value is configured or indicated via a higher layer, the UE repeats the transmission the indicated number of times. Therefore, in all the methods above and the methods hereafter, the discussion of the scheduling of 'n PUSCH transmission occasions', 'n PUSCHs' or 'n PUSCH occasions' may refer to a PUSCH scheduled by a PDCCH or a higher layer grant with a total of n transmissions (it can be understood as scheduling with n−1 repetitions of a first PUSCH transmission or just n PUSCH transmission repetitions) where the value of n or n−1 is indicated via a higher layer. In an alternative, the repetition parameter or value may be configured and/or indicated via the PHY-layer as well.

Uplink Channel Sounding for Multi-TRP Transmissions

Before the UE performs uplink PUSCH transmissions to multiple TRPs, the UE may apply an SRS-based channel sounding using one or more SRS resource set(s). For such an uplink channel sounding, the beam direction (or spatial relation) and power control setting of the transmitted SRS need to be adjusted per TRP. Different methods for the SRS configuration are discussed in the following: First, the timeline of the sounding process and the scheduling of the PUSCH(s) that follow(s) the SRS transmission is discussed. Considering an example scenario where the UE would like to perform UL transmissions to two TRPs, the following sequence of events or steps may ensue:

0) When the UE does not satisfy the beam correspondence property, the UE is configured to perform an uplink beam sweeping using SRS transmissions, wherein the SRS is configured as 'beam management'. The UE performs the UL channel sounding to both TRPs and determines in this way suitable beam directions to both TRPs.
1) The SRS resource(s) in an SRS resource set associated with the first TRP is/are transmitted by the UE to sound the channel between the UE and the first TRP. The SRS resource(s) are assigned with one or more spatial relations (e.g., the spatial relations obtained from the SRS sounding event in step 0). The SRS resource set is associated with a pathloss reference RS related to the first TRP.
2) Repeat step 1 for the second TRP.
3) The network node indicates one or more SRS resource(s) from the SRS resource set(s) used in step 1 and step 2 to the UE for the transmission of the PUSCH(s) to the two TRPs.

The SRS resources used for channel sounding to one or more TRPs may be from the same or different SRS resource sets.

In a first method the SRS resources in step 1 and step 2 may be associated with different SRS resource sets and the SRS resources in the DCI scheduling the PUSCH need to be indicated.

In accordance with an embodiment, the UE is configured to receive a single PDCCH or a higher layer grant scheduling n (n>1) PUSCH transmissions or n (n>1) PUSCH segments, where the PDCCH indicates n SRS resources from n different SRS resource sets. The SRS resources may be indicated, for example, via an existing field (e.g., the SRI field) or via a newly defined field in the DCI. Each indicated SRS resource is associated with a PUSCH transmission or PUSCH segment and its transmission is performed by the UE using the SRS port(s) associated with the SRS resource. In a special case, the PDCCH or higher layer grant may provide up to n SRS resources, i.e., the number of SRS resources indicated is n'≤n. In one example, a field that comprises n' SRIs may be provided in the scheduling PDCCH or higher layer grant. The field may comprise $$\sum_{i=1}^{n'} b_i$$

bits with b bits used for a single SRI, wherein each SRI indicates an SRS resource from a different SRS resource set. In a second example, the SRI field may map to n' SRS resources, wherein each SRS resource is from a different SRS resource set. When n'<n, an indicated SRS resource may be associated with more than one PUSCH transmission occasion or PUSCH segment.

For non-codebook-based PUSCH, the following method may also be used.

In accordance with an embodiment, the UE is configured to receive a single PDCCH or a higher layer grant scheduling n (n>1) PUSCH transmissions or n (n>1) PUSCH segments, where the PDCCH indicates SRS resources from n'≤n different SRS resource sets while selecting up to $1 \leq l_i \leq R_i$ resources from the i-th set. The value $R_i$ and/or $l_i$ for i=1 . . . n may be the same for all values of i or different. It may denote the maximum number of layers scheduled to the UE or the maximum number of layers supported by the UE or the maximum number of resources in a i-th SRS resource set. It may be reported by the UE, obtained/determined via PHY layer or higher layer configuration or signaling, or fixed in the NR specifications. The SRS resources may be indicated, for example, via an existing field (e.g., the SRI field) or via a newly defined field in the DCI. Each indicated group of SRS resources from an SRS resource set is associated with a PUSCH transmission or PUSCH segment and its transmission is performed by the UE using the SRS/antenna port(s) associated with the group of SRS resource(s). In one example, a field that comprises n' SRIs may be provided in the scheduling PDCCH or higher layer grant. The field may comprise $\sum_{i=1}^{n'} b_i$ bits with $b_i$ bits used for the i-th SRI, wherein each SRI indicates one or more SRS resources from an SRS resource set that is different from the SRS resource sets associated with at least one other SRI. In a second example, a codepoint of the SRI field may map to n' groups of SRS resources, wherein each group comprises of one or more SRS resources chosen from an SRS resource set that is different from the SRS resource sets associated with at least one other group of SRS resources. In an example, the UE may support up to R layers of PUSCH and all the resource sets may have $R_i \geq R$ resources in them. The network node may schedule 1≤l≤R layers of PUSCH by indicating l resources from each of the said one or more SRS resource sets thereby enabling the same number of data layers or streams for each PUSCH transmission occasion. In a special case, an SRS resource in any of the associated SRS resource sets may comprise just one antenna/SRS port. Therefore, the number of layers scheduled for a PUSCH transmission occasion would be identical to the number of SRS resources associated with the PUSCH transmission occasion. This would mean that the number of DMRS ports indicated for a PUSCH transmission occasion is the same as the number of SRS resources associated with it.

When multiple SRS resource sets are used for uplink channel sounding to each TRP, the pathloss reference RS(s) and the spatial relation(s) for each SRS resource set may be separately configured or indicated to the UE. The network node may jointly trigger the SRS resource sets for multi-TRP uplink channel sounding as proposed in the following exemplary embodiment.

In accordance with an embodiment, the UE is configured to receive via a higher layer from the network node or gNB, an indication that associates one or more SRS resource sets with a common index (e.g., a trigger state index). The trigger state may be associated with multiple SRS resource sets so that the transmission of the multiple SRS resource sets can be enabled with a single message via the PHY layer (a PUSCH/PDSCH scheduling DCI or a PDCCH using any other DCI format) or via a higher layer that indicates the associated trigger state. The association of multiple SRS resource sets with a trigger state and the triggering of the transmission of the SRS resource sets with said trigger state may be performed via the same or different communication layers. For example, the trigger state for an SRS resource set may be indicated by a MAC-CE message and another MAC-CE message from the network node may use the trigger state to trigger one or more SRS resource sets associated with the trigger state. In another example, the trigger state for an SRS resource set may be indicated via RRC and a MAC-CE message or PHY-layer indication from the network node may use the trigger state to trigger one or more SRS resource sets associated with the trigger state.

Similar to the use of the trigger state to trigger or activate the transmission of the SRS resource sets, they may also be used to deactivate or terminate the transmission of the SRS resource sets that are active or that are being transmitted. The trigger state may be used in a MAC-CE message, a PHY-layer indication or an RRC message or in a combination of two or more of them to indicate the deactivation or the disabling or the termination of the transmission of the SRS resource sets that are associated with the trigger state.

In a second method the same SRS resource set may be used to sound to the two TRPs as previously described in step 1 and step 2. In this case, a pathloss reference RS and a spatial relation associated with the SRS resource set need to be related to a TRP. One way is to reconfigure via a higher layer the pathloss reference RS and spatial relation of the SRS between the transmission of the SRS from one TRP to the other TRP. However, such a method may incur high latency and signaling overhead and requires specifying an interval between the transmissions of the SRS to different TRPs. An alternative method would be to define SRS resource sets that are associated with different spatial relation and pathloss reference RS assumptions for different transmission occasions without requiring a reconfiguration between the transmission occasions.

In a third method, a single message or single signaling that triggers or activates the transmission of more than one SRS resource set may be received by the UE from a network node or gNB. For example, a MAC-CE message may be received by the UE that activates or triggers the transmission of more than one SRS resource set. The MAC-CE message may comprise at least the identifier(s) or index/indices that map to each of the more than one activated or triggered SRS resource sets. In another example, the activation or triggering may be contained in a PHY-layer signaling (a downlink control information, for example) wherein the signaling may comprise the indices or identifiers that map to each of the more than one activated or triggered SRS resource sets. Similarly, the deactivation or termination of the SRS resource sets that are active or that are being transmitted may be performed via a single PHY-layer message, a single MAC-CE message or an RRC message or a combination of two or more of them, wherein the identifiers or indices that map to each of the more than one SRS resource sets that are to be terminated are present in the message or the signaling from at least one of the communication layers.

According to an embodiment, the UE is configured to receive a PDCCH or a higher layer grant scheduling n (n>1) PUSCH transmissions wherein the scheduling PDCCH or higher layer grant indicates SRS resource(s) via one or more SRI fields in the scheduling PDCCH or higher layer grant. The antenna/SRS port(s) associated with one or more SRS resources indicated by the PDCCH or higher layer grant is/are used for at least one PUSCH transmission occasion scheduled by the PDCCH or higher layer grant. The UE may be indicated with up to n'≤n groups of SRS resources wherein each group comprises one or more SRS resources and every group of SRS resource(s) is associated with a different SRS resource set. For an indicated group of one or more SRS resource(s) via the SRI field(s), the SRS resource set to which the SRS resource(s) belongs to or associated with can be determined based on at least one of the following methods:

A first group of one or more SRS resource(s) indicated by the SRI field(s) is associated with an SRS resource set with ID $s_1$ and a second group of one or more SRS resource(s) indicated by the SRI field(s) which, in terms of the order of indication by the SRI field(s), is after said first group of SRS resource(s), is associated with an SRS resource set with ID $s_2$, wherein $s_2 > s_1$ or $s_2 < s_1$. This means that the order in which a group of one or more SRS resource(s) are indicated has a one-to-one mapping with an ordered set of the SRS resource sets according to their SRS resource set ID values (for e.g., ascending or descending order) and this rule may be fixed in the NR specifications. The SRI may be associated with the most recent transmission of said SRS resource sets using said ordering of the SRS resource set indication.

A first group of one or more SRS resource(s) indicated by the SRI field(s) is associated with an SRS resource set whose resource(s) were the most recently transmitted before or after a specific time or a reference time t' and a second group of one or more SRS resource(s) indicated by the SRI field(s) which, in terms of the order of indication by the SRI field(s), is after said first group of one or more SRS resource(s) is associated with an SRS resource set that is the second most recently transmitted before or after the specific time or reference t'. In a special case, if the SRI field(s) indicate SRS resource(s) only from one SRS resource set or if the indication of only one group of one or more SRS resource(s) from one of the SRS resource sets is valid or selected or considered, then the most recently transmitted one with respect to the specific time to reference time t' is the referenced or associated SRS resource set.

The antenna port(s) associated with the SRS resource(s) indicated by one or more SRI field(s) are used for the transmission of the PUSCH in at least one of the n scheduled PUSCH occasions. The mapping of the SRI fields to the PUSCH transmission occasions may follow any of the related embodiments in this disclosure.

The time reference t' may be determined or assumed based on at least one of the following, among others:
  the first or the last slot/symbol of one of the scheduled PUSCH transmission(s),
  the first or the last slot/symbol of one of the PDCCH(s) scheduling the PUSCH(s) (the PDCCH/DCI scheduling the PUSCH transmission(s) may be repeated via multiple PDCCH(s) for reliability of the PDCCH. Using the first PDCCH/DCI of the multiple PDCCH/DCI repetitions for the PUSCH scheduling as the reference would mean that the subsequent PDCCH(s)/DCI(s) also give(s) the same SRI references and hence would be a better choice. If one of the later PDCCH(s)/DCI(s) are used, the PDCCH(s)/DCI(s) before the reference point may give different SRI references from the ones after the reference point),
  the first or the last slot/symbol of one of the PDCCH(s) triggering the SRS resource set(s),
  the first or the last slot/symbol of one of the PDSCH(s) that comprises the MAC-CE command activating the SRS resource set(s),
  the first or the last slot/symbol of one of the PUCCH resource(s) carrying the HARQ ACK for the PDSCH(s) that comprise the MAC-CE command activating the SRS resource set(s).

Note: For n different UL/DL transmissions for which the time instances corresponding to the start or finish of the transmissions are $t_1 \ldots t_n$, the most recent transmission before or after a time instance t' would be the one that has the least value for $|t'-t_i|$, i=1 ... n.

The SRS resource sets corresponding to the SRI field(s) in the scheduling PDCCH, or higher layer grant may be associated with different time-domain behaviours according to the above embodiment. Depending on transmission time, the SRS resources corresponding to the SRI field(s) may be determined irrespective of their time-domain behavior. However, if conflicts should arise as to which kind of SRS resource sets shall be chosen, if different resource sets of varying periodicities are present with the same usage, then corresponding directives for the UE are necessary.

According to an embodiment, at least one of the following properties of an SRS resource set associated with a first SRI field is the same as that of the SRS resource set corresponding to one other SRI field in the scheduling PDCCH or higher layer grant: the usage of the SRS resource sets (all of them may be either codebook or non-codebook SRS resource sets), the time-domain behavior (all of them may be either aperiodic, periodic or semi-persistent resource sets). This can be ensured in multiple ways. In a first example, the UE is configured to associate an SRI field with an SRS resource set of the same time-domain behavior as the SRS resource set that is transmitted most recently before or after a said time t', which can be any of the aforementioned reference points. In a second example, the UE is configured to associate an SRI field with an SRS resource set of the same time-domain behavior as a SRS resource set $S_R$, wherein the SRS resource set $S_R$ is determined based on at least one of the following rules: SRS resource set $S_R$ has a higher priority in terms of the time-domain behavior. The priority rule may apply for transmissions before or after a certain time F. For example, a predetermined priority rule may be provided to the UE via a network node, known to the UE or fixed in the specifications—aperiodic>semi-persistent>periodic—and the UE may determine the SRS resource sets that it may associated the SRI field(s) with by the SRS resource set with the highest priority transmitted after a given time F.

SRS resource set $S_R$ is configured via a higher layer. A MAC-CE or RRC signaling may be provided to indicate to the UE which SRS resource set to choose for a given PDCCH/DCI or higher layer grant. For a higher layer grant, it may be provided in the higher layer grant itself.

Note: In the above embodiment(s), the methods applicable for multiple SRS resource set(s) associated with multiple SRI fields may also be applicable in the case of the use of a single SRI field that is associated with multiple SRS resource sets.

According to an embodiment, the UE is configured to receive a higher layer configuration of an SRS resource set, wherein the SRS resource set comprises one or more SRS resources. Each SRS resource is associated with one or more SRS ports. Furthermore, the SRS resource set may be associated with more than one pathloss reference RS. In addition, each SRS resource in the configured SRS resource set may be associated with more than one spatial relation parameter, if applicable. In a variation of this embodiment, the association of the SRS resource set or SRS resource with multiple pathloss reference RSs or spatial relations may be performed via a MAC-CE message or any other higher layer.

For example, the UE may be configured with one said SRS resource set via a higher layer comprising 4 SRS resources. The SRS resource set may be configured with 2 pathloss reference RSs, and each SRS resource in the set may be configured with 2 spatial relation parameters. When the SRS resource is triggered for transmission, the UE transmits the SRS resources in the SRS resource set on a first transmission occasion with the first spatial relation and pathloss reference RS assumptions provided in the SRS configuration and on a second transmission occasion with the second spatial relation and pathloss reference RS assumptions provided in the SRS configuration.

After the UE performs the transmission of said SRS resource set on two occasions, the UE may schedule one or more PUSCH transmissions by indicating one or more SRS resources from the SRS resource set used in the two occasions of sounding, and thereby indicating the antenna ports to be used for the PUSCH transmission(s).

Note: The term 'one or more fields' corresponding to a parameter, if applicable, or the indication 'one or more values' by a field or a codepoint of a field corresponding to a parameter, if applicable, in a downlink control information or higher layer grant in any of the embodiments in this disclosure may be interpreted in different ways. A field can be interpreted as a collection of x≥1 bit(s) that are used to indicate one or more values, for a certain parameter, if applicable. If a field is said to provide y≥1 values, it can be performed via two different methods:

A single codepoint of the field, i.e., a given x-bit pattern of the field, may provide the y values. A single codepoint maps to y values, wherein the mapping is either indicated to the UE via a network node via PHY layer of higher layer signaling or preconfigured or known to the UE, i.e., fixed in the NR specification.

A given x-bit pattern of the field, i.e., a codepoint of the field, comprises y partitions or parts wherein the i-th part (i=1, . . . , y) indicates a i-th value. The x-bit pattern, in total, provides y values with the i-th partition or part comprising of $z_i$ bits providing or indicating a single value. The field sizes $z_i$, i=1, . . . y satisfy $$x = \sum_{i=1}^{y} z_i.$$

This case may also be interpreted as a presence of multiple fields for the parameter (a total of y fields for the parameter), wherein each field provides one value for the parameter.

If multiple fields are said to provide multiple values for said parameter, each field may provide one or more values either via partition of the field or mapping of one or more values to a single codepoint of a field as described above, wherein a partition of the field to interpret individual values may not be possible. Hence, the interpretation of field(s) and their indicated value(s) in the disclosure may be performed in any of the aforementioned ways.

Note: Any reference to the transmission of an SRS resource set in this disclosure, refers to the transmission of at least one resource in the SRS resource set.

SRI Indication

The indication of the SRS resources for the n≥1 PUSCH transmissions scheduled via the PDCCH or the higher layer grant is performed via one or more SRI fields. When one SRI field is used, each codepoint of the field may provide up to n'≤n SRS resources for the n PUSCH transmission occasions. When multiple SRI fields are used, then each SRI field may indicate a single SRS resource. In both the methods of SRI indication, an important point of concern is the possibility of dynamic switching between single-TRP and multi-TRP based PUSCH transmission scheduling. If a single SRI field is used for the indication of the SRS resources, there may be codepoints in the field that indicate just one SRS resource from one of the SRS resource sets, thereby enabling PUSCH transmission to just a single TRP. When multiple SRI fields are used, the dynamic switching between single- and multi-TRP has to be performed by other means.

In accordance with embodiments, a UE is configured to receive a PDCCH or a higher layer grant scheduling n>1 transmissions that comprises n'≤n SRI fields, wherein at least one of the SRI fields may comprise at least one of the following:
- a reserved codepoint in the SRI field that indicates that no SRS resource is chosen from one or more SRS resource set(s) corresponding to the SRI field,
- a 1-bit value that indicates if the SRS resource(s) indicated by the SRI field in the corresponding one or more SRS resource set(s), which may be provided by the rest of the bits of the SRI field, is to be used or not for at least one of the PUSCH transmission occasion(s) scheduled by the PDCCH or higher layer grant. In a special case, if a SRI field corresponding to an SRS resource set has 0 bits, which may happen when the SRS resource set has just one resource, the 1-bit value may still be present to indicate if the SRS resource set is used or not.

In accordance with embodiments, a UE is configured to receive a PDCCH or a higher layer grant scheduling n>1 transmissions that comprises n'≤n SRI fields, wherein a b-bit field may be within or is found along with the SRI field(s) or as a separate field, where b≥1, that indicates at least one of the following:
- None of the SRS resources indicated by the SRI field(s) are to be used for the PUSCH transmission occasion(s) scheduled by the PDCCH or higher layer grant.
- The SRS resource(s) indicated by at least one of the SRI field(s) is not used for any of the PUSCH transmission occasion(s) scheduled by the PDCCH or higher layer grant.
- The bit field of at least one of the SRI field(s) is not used to determine the SRS resource(s) from the corresponding SRS resource set(s) for any of the PUSCH transmission occasion(s) scheduled by the PDCCH or higher layer grant.
- The bit fields of only a proper subset of the SRI field(s) in the PDCCH or higher layer grant are used for at least one PUSCH transmission occasion scheduled by the PDCCH or higher layer grant.
- The SRS resource(s) indicated by every SRI field in the PDCCH, or higher layer grant is used for at least one PUSCH transmission occasion scheduled by the PDCCH or higher layer grant.

If one of the SRIs in the PUSCH-scheduling PDCCH or higher layer grant is not used for any of the PUSCH transmission occasions, then other corresponding parameters may also be 'disabled'. Examples of said corresponding parameters may include a RV value and/or a precoder index/value and/or a TPC command, etc. For example, if a first SRI indicated by the PDCCH or higher layer grant is indicated to not be used for any PUSCH transmission occasion, or if a first SRI indicated by the PDCCH or higher layer grant is not associated with any PUSCH transmission occasion, then a first RV value and/or precoder index/value and/or TPC command, which may or may not have a correspondence with a first SRI, indicated by the PDCCH or higher layer grant is also not associated with any PUSCH transmission occasion. If a second SRI indicated by the PDCCH or higher layer grant is indicated to not be used for any PUSCH transmission occasion, or if a second SRI indicated by the PDCCH or higher layer grant is not associated with any PUSCH transmission occasion, then a second RV value and/or precoder index/value and/or TPC command, which may or may not have a correspondence with a second SRI, indicated by the PDCCH or higher layer grant is also not associated with any PUSCH transmission occasion.

Note: The usage of 'SRI fields' in the above embodiments may also mean the usage of a single SRI field that comprises of multiple partitions or parts, with each partition or part indicating an SRI. In this case, each indicated SRI may be associated with a different SRS resource set.

In the case of non-codebook PUSCH, when the number of layers in the different transmission occasions is kept the same, the SRI field(s) may also indicate the same number of SRS resources for the different PUSCH transmission occasion(s).

In accordance with embodiments, a UE is configured to receive a PDCCH or a higher layer grant scheduling n>1 transmissions that comprises n'≤n SRI fields, wherein a given SRI field indicates the same number of SRS resources as at least one other SRI field.

It should be mentioned that the number of scheduled transmissions occasions is not limited to two or to any specific number. Hence the examples presented earlier do not restrict the subject-matter of the presented embodiments.

With the higher layer configuration and the PHY-layer signaling provided above, different PUSCH reliability techniques may be enabled via various ways of multiplexing. In the following, two examples are presented which discuss multi-TRP based PUSCH frameworks that may be realized using the embodiment described earlier.

Example 1: Higher Layer Indication and DMRS Port Indication-Based Multi/Segmented-PUSCH In this example, a higher layer indication aided scheduling of multi-PUSCH or segmented-PUSCH is provided. The multiplexing scheme is determined via a combination of DMRS port indication and higher layer signaling.
- The UE may be indicated via a higher layer that it may receive a PDCCH or a higher layer grant that schedules
  - n PUSCH transmission occasions (n>1) or
  - one PUSCH transmission occasion with n (n>1) segments.
- Depending on certain parameters indicated for e.g., a specific multiplexing scheme indication or parameter(s) required for a specific multiplexing scheme, via one or more higher layer(s), the multiplexing scheme may be determined. Therefore, switching between schemes requires higher layer indication. The illustration in FIG. 3 provides an example where the CDM grouping of the indicated DMRS ports along with the higher layer indication of required parameter(s) determines the multiplexing scheme used in the transmission. As shown in FIG. 3:
- 301. a higher layer signalling indicating the scheduling of multi-PUSCH transmission (occasions) or segmented PUSCH transmission is received by a UE (not shown) in e.g. a PDCCH and optionally, a higher layer signalling indicating of a multiplexing scheme.
- 302. if the PDCCH indicates DMRS ports with n (n>1) CDM groups, the following may occur:
  - 302a. if the higher layer signalling indicates FDM transmission, the UE performs FDMed multi-PUSCH or segmented PUSCH transmissions,
  - 302b. if no higher layer signaling of a multiplexing scheme is received, the UE performs SDMed multi-PUSCH or segmented PUSCH transmissions.
- 303. if the PDCCH indicates DMRS ports with n=1 CDM group, the following may occur:

303a. if the scheduling is within a slot and/or the higher layer signaling indicates a symbol offset between two transmission occasions/segments, the UE performs intra-slot TDM of multi-PUSCH or segmented PUSCH, 303b. if the higher layer signaling indicates a repetition value for the number of PUSCHs, the UE performs inter-slot TDM of multi-PUSCH.

Example 2: Dynamic Switching Between Multiplexing Schemes

Figure 4:
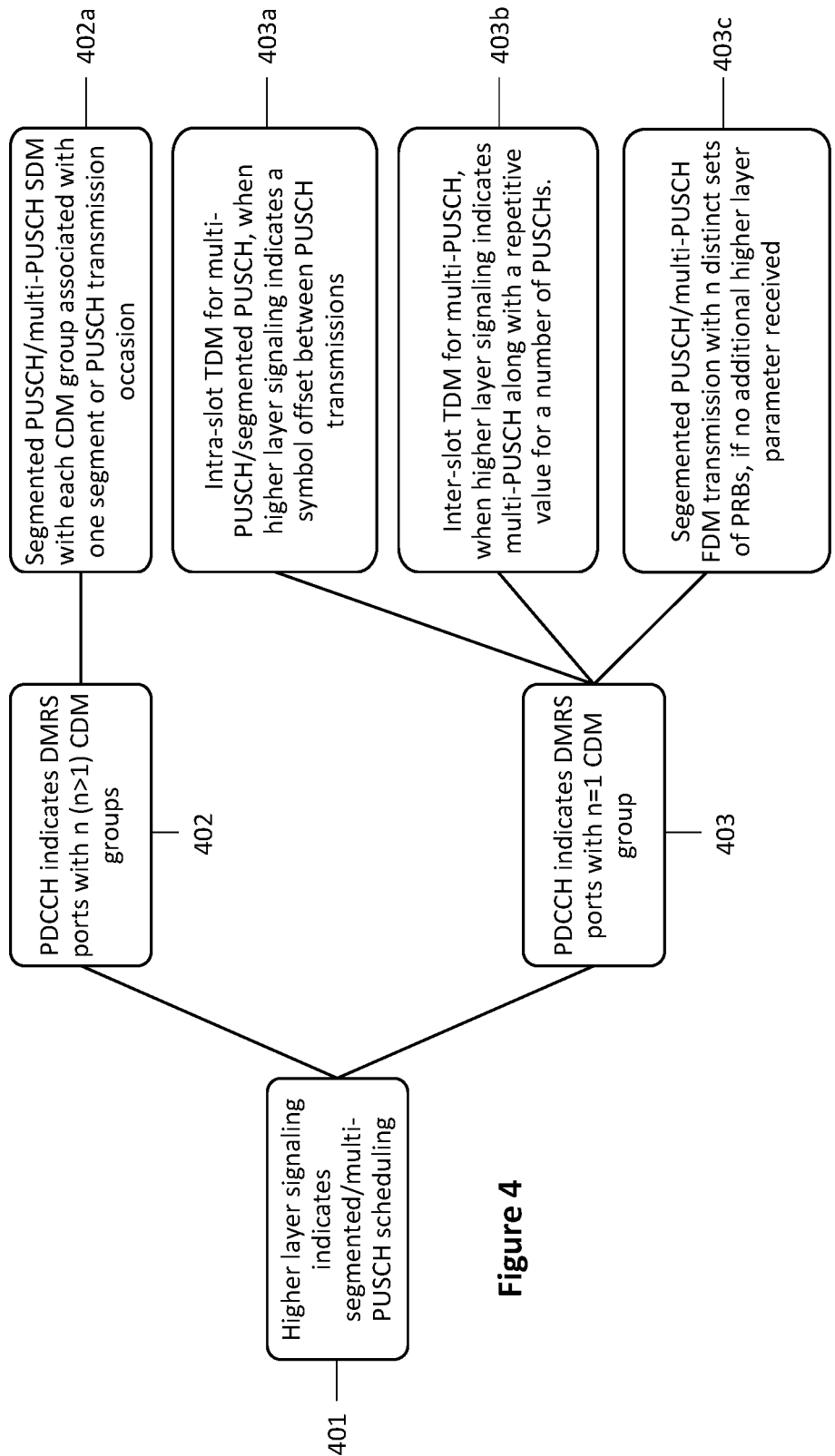
FIG. 4 depicts another example of a dynamic switching between multiplexing schemes according to some embodiments.

In this example, a method that uses dynamic scheduling of a desired multiplexing scheme via the number of DMRS ports indicated is presented with reference to FIG. 4.

FIG. 4 illustrates the indication required for each of the following multiplexing schemes:

Multi-PUSCH or segmented PUSCH SDM,
Multi-PUSCH or segmented PUSCH FDM,
Intra-slot TDM for multi-PUSCH and segmented PUSCH, or
Inter-slot TDM for multi-PUSCH In this exemplary scenario, the multiplexing scheme is dynamically switched between segmented SDM and FDM as no additional higher layer parameters are required for their transmission. Depending on the number of CDM groups, an appropriate multiplexing scheme between SDM and FDM may be scheduled. The TDM scheme of choice may be indicated via an appropriate higher layer parameter. This framework provides scheduling flexibility with dynamic switching via PHY-layer signaling of the DMRS ports.

As shown in FIG. 4:

401. a higher layer signalling indicating segmented/multi-PUSCH scheduling is received by a UE (not shown) in e.g. a PDCCH.

402. if the PDCCH indicates DMRS ports with n (n>1) CDM groups, 402a. segmented PUSCH/multi-PUSCH SDM transmission with each CDM group associated with one segment or PUSCH transmission occasion is performed by the UE.

403. if the PDCCH indicates DMRS ports with n=1 CDM group, the following may occur:

403a. if the higher layer signaling indicates multi-PUSCH/segmented PUSCH along with a symbol offset between PUSCH transmissions, the UE performs intra-slot TDM for multi-PUSCH/segmented PUSCH transmissions, 403b. if the higher layer signaling indicates multi-PUSCH along with a repetitive value for the number of PUSCHs, the UE performs inter-slot TDM for multi-PUSCH transmissions, 403c. if the higher layer signaling indicates segmented PUSCH/multi-PUSCH if no additional higher layer parameter is received, the UE performs segmented PUSCH/multi-PUSCH FDM transmission with n distinct sets of PRBs associated to each segment or each PUSCH transmission occasion.

The above two examples for multi-PUSCH or segmented-PUSCH transmissions may be realized using the previously described embodiments of this disclosure.

Figure 5:
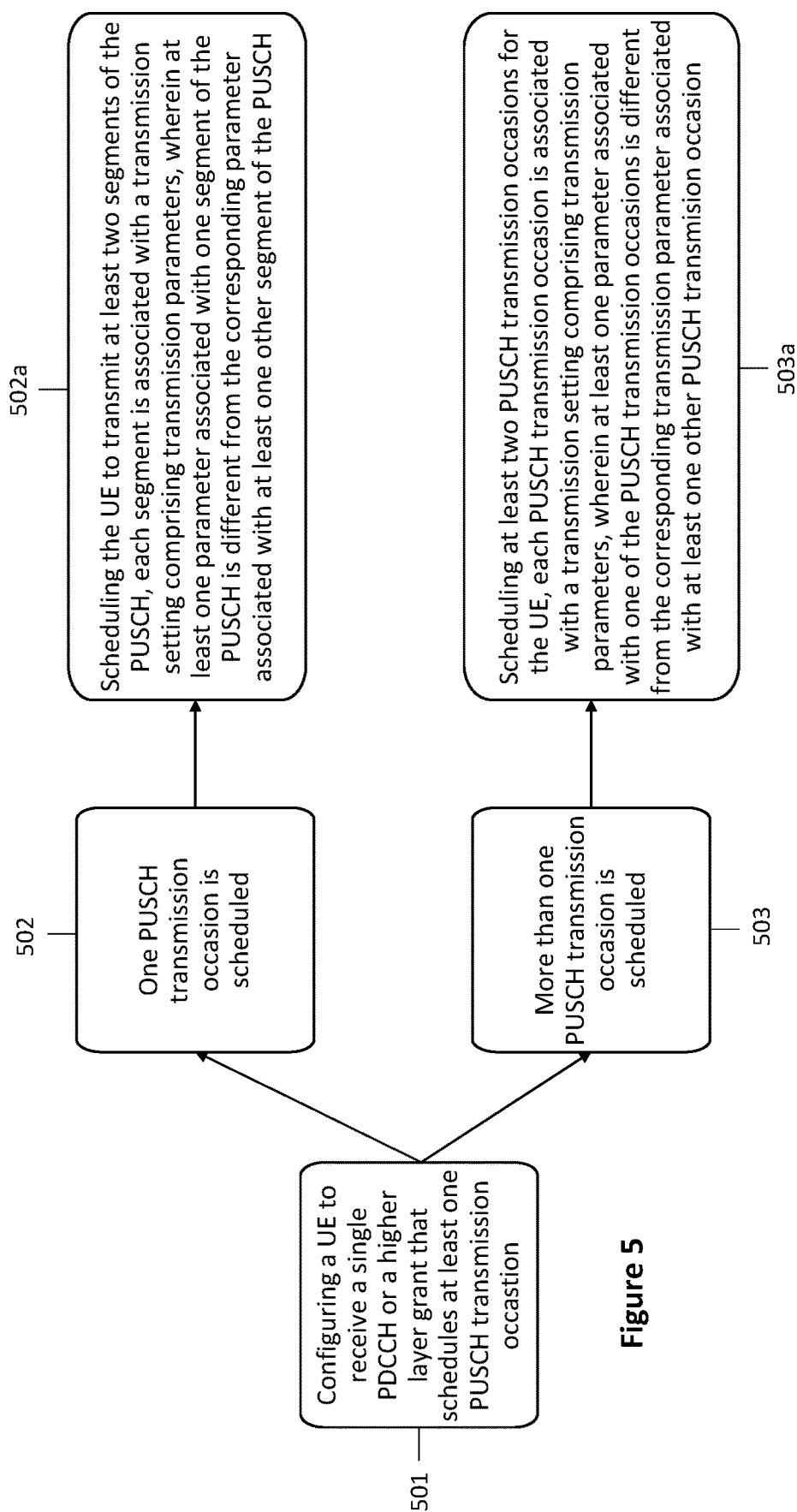
FIG. 5 illustrates a flowchart of a method performed by a network node according to some embodiments.

Referring to FIG. 5, there is illustrated a flowchart of a method performed by a network node according to some exemplary embodiments described earlier. As shown, the method comprises:

(501) configuring a UE to receive a single PDCCH or a higher layer grant that schedules at least one PUSCH transmission occasion for the UE;

(502) If one PUSCH transmission occasion is scheduled, the method comprises:

(502a) scheduling the UE to transmit at least two segments of the PUSCH, wherein each segment of the PUSCH is associated with a transmission setting comprising a set of transmission parameters; and wherein at least one transmission parameter associated with one of the segments of the PUSCH is different from the corresponding transmission parameter associated with at least one other segment of the PUSCH;

(503) if more than one PUSCH transmission occasion is scheduled, the method comprises:

(503a). scheduling at least two PUSCH transmission occasions for the UE, wherein each PUSCH transmission occasion is associated with a transmission setting comprising a set of transmission parameters, wherein at least one transmission parameter associated with one of the PUSCH transmission occasions is different from the corresponding transmission parameter associated with at least one other PUSCH transmission occasion As previously described the transmission setting including the transmission parameters are included in the PDCCH (or DCI) or in the higher layer grant.

According to an embodiment, the transmission setting associated with a PUSCH segment or a PUSCH transmission occasion includes the following transmission parameters: antenna port(s); DMRS port(s), pathloss reference RS for determining a pathloss estimate for the transmission, one or more TPC commands for the transmission, a spatial relation or a beam direction, frequency domain resource(s) and time domain resource(s) etc.

As previously described, the method comprises: scheduling to the UE at least two PUSCH segments or at least two PUSCH transmission occasions, wherein a set of PRBs on which at least one PUSCH segment or PUSCH transmission occasion is scheduled is partially or completely distinct from a set of PRBs on which at least one other PUSCH segment or one other PUSCH transmission occasion is scheduled.

The method further comprise: scheduling to the UE at least two PUSCH segments or at least two PUSCH transmission occasions wherein all PUSCH segments or all PUSCH transmission occasions are scheduled within the same slot and each PUSCH segment or each PUSCH transmission occasion is scheduled in a set of symbol(s) that is/are distinct from the set of symbol(s) on which the other PUSCH segment(s) or PUSCH transmission occasion(s) are scheduled. By the same slot is meant the same time slot.

As previously described, the method comprises scheduling to the UE at least two PUSCH segments or at least two PUSCH transmission occasions wherein each PUSCH segment or each PUSCH transmission occasion is associated with a distinct set of DMRS ports and/or antenna ports.

The method further comprises scheduling to the UE at least two PUSCH transmission occasions wherein each PUSCH transmission occasion is scheduled in a different slot. The PUSCH transmission occasions may be associated with the same or different PUSCH transport blocks.

According to an embodiment, the method comprises scheduling to the UE at least two PUSCH transmission occasions or at least two PUSCH segments, wherein each PUSCH transmission occasion or PUSCH segment is associated with distinct antenna port(s) and/or DMRS port(s), and wherein a first set of antenna port(s) is associated with a first SRS resource and a second set of antenna port(s) is associated with a second SRS resource.

As previously described, the single PDCCH or the higher layer grant that schedules at least two PUSCH transmission occasions or at least two PUSCH segments includes an SRS resource indicator field that maps to or indicates one or more SRS resources, and wherein each SRS resource is associated with at least one PUSCH transmission occasion or PUSCH segment, and wherein each PUSCH transmission occasion or PUSCH segment is transmitted using the SRS port(s) of the associated SRS resource.

The single PDCCH or the higher layer grant that schedules at least two PUSCH transmission occasions or at least two PUSCH segments may comprise an uplink-transmission configuration indication (UL-TCI) field whose values or codepoints map to or indicate one or more UL-TCI states, and wherein each indicated UL-TCI state is associated with one or more PUSCH transmission occasion(s) or PUSCH segment(s) and each UL-TCI state provides at least one of the following transmission parameters: DMRS port(s), antenna port(s), spatial relation, and pathloss reference RS, and wherein each PUSCH transmission occasion or PUSCH segment is transmitted using the transmission parameter(s) provided by the associated UL-TCI state.

The PDCCH or the higher layer grant that schedules one or more PUSCH transmission occasions may indicate: at least one antenna port to be used for the PUSCH(s) by an SRS resource indicator field that indicates one or more SRS resources, and at least one spatial relation or beam direction to be used for the PUSCH(s) by an UL-TCI field that indicates one or more UL-TCI states.

According to an embodiment, the method comprises configuring to the UE, via a higher layer, the number of repetitions of at least one scheduled PUSCH transmission occasion and wherein the scheduling PDCCH or higher layer grant indicates one or more UL-TCI states and/or one or more SRS resources and wherein each PUSCH transmission occasion is associated with one of the indicated UL-TCI states and/or one of the indicated SRS resources. The number of repetitions may be equal to the number of indicated UL-TCI states or SRS resources. If the number of repetitions of PUSCH transmission occasions is larger than the number of UL-TCI states or larger than the number of SRS resources, the method comprises: configuring the UE to apply a pattern for cyclic or sequential association between the indicated UL-TCI states or the SRS resources and the PUSCH transmission occasions.

According to an embodiment and as previously described, the PDCCH or the higher layer grant indicates may indicate as many TPC commands or SRS resources or UL-TCI states or sets of DMRS port(s) or redundancy version (RV) values as the number of scheduled PUSCH transmission occasions or PUSCH segments, wherein each PUSCH transmission occasion or PUSCH segment is associated with a distinct TPC command or SRS resource or UL-TCI state or set of DMRS port(s) or redundancy version value.

According to an embodiment, one or more RV offset values may indicated in the PDCCH or in the higher layer grant or by other higher layer signaling and wherein the RV of at least one PUSCH transmission occasion is determined using one of the indicated RV offset values and the RV of another scheduled PUSCH transmission occasion.

According to an embodiment, the method may comprise configuring to the UE a higher layer parameter that indicates an offset in terms of a number of symbols between two PUSCH transmission occasions or two PUSCH segments.

According to an embodiment, the method may comprise configuring to the UE via a higher layer an indication of a common index or a trigger state for one or more SRS resource sets and using the common index or the trigger state to enable the transmission of SRS resource set(s), associated with the common index or trigger state, via the physical layer or a higher layer.

According to an embodiment, an SRS resource set is associated via a higher layer signaling or configuration with multiple pathloss reference RSs and at least one SRS resource in said SRS resource set is associated via a higher layer signaling or configuration with multiple spatial relations and wherein a first pathloss reference RS and/or spatial relation is used in a first SRS transmission occasion and a second configured pathloss reference RS and/or spatial relation is used in a second SRS transmission occasion.

Figure 6:
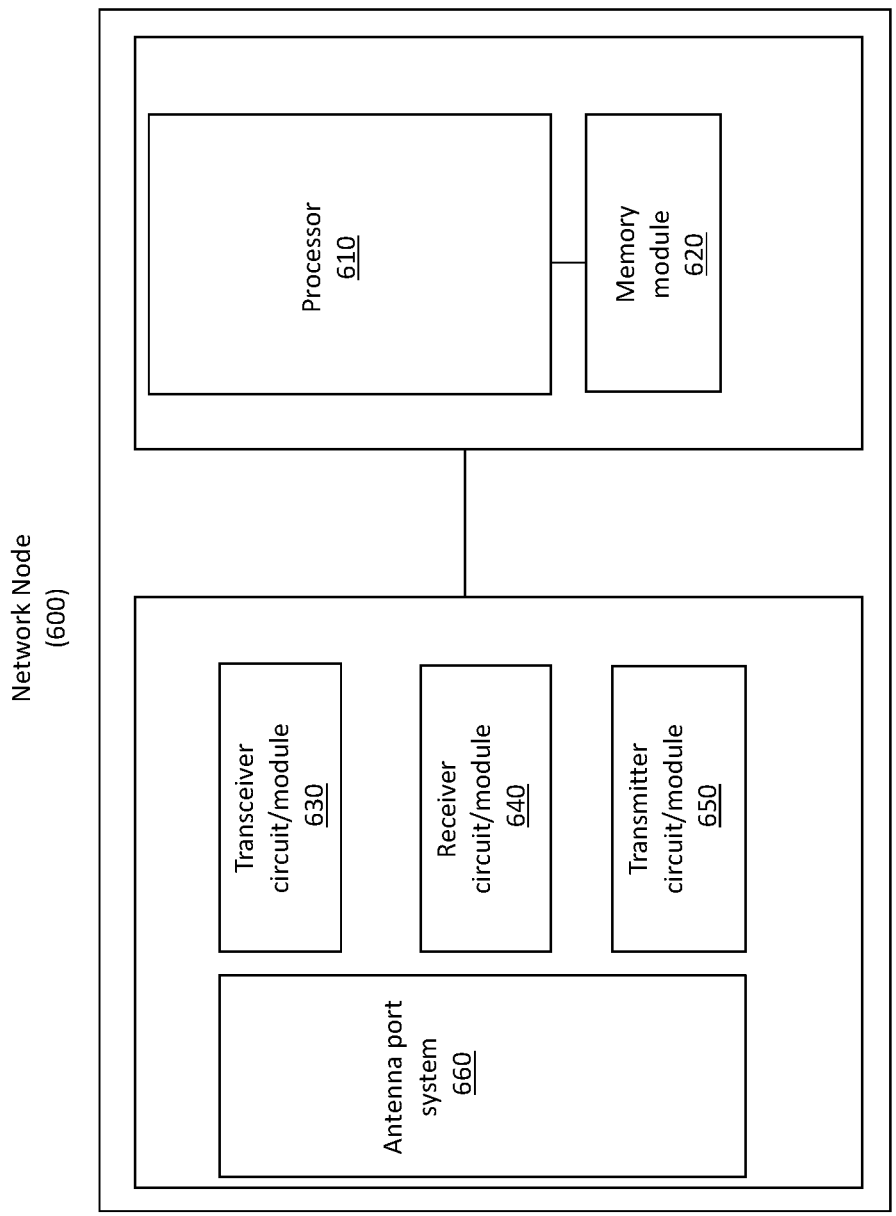
FIG. 6 depicts a block diagram of a network node according to some exemplary embodiments.

In order to perform the previously described process or method steps performed by the network node, there is also provided a network. FIG. 6 illustrates a block diagram depicting a network node. The network node 600 comprises a processor 610 or processing circuit or a processing module or a processor or means 610; a receiver circuit or receiver module 640; a transmitter circuit or transmitter module 650; a memory module 620 a transceiver circuit or transceiver module 1330 which may include the transmitter circuit 650 and the receiver circuit 640. The network node 600 further comprises an antenna system 660 which includes antenna circuitry for transmitting and receiving signals to/from at least the UE. The antenna system employ beamforming as previously described. The actions performed by the network node have already been described. The network node may also be viewed as a TRP.

The processing module/circuit 610 includes a processor, microprocessor, an application specific integrated circuit (ASIC), field programmable gate array (FPGA), or the like, and may be referred to as the "processor." The processor 610 controls the operation of the network node and its components. Memory (circuit or module) 620 includes a random access memory (RAM), a read only memory (ROM), and/or another type of memory to store data and instructions that may be used by processor 610. In general, it will be understood that the network node in one or more embodiments includes fixed or programmed circuitry that is configured to carry out the operations in any of the embodiments disclosed herein.

In at least one such example, the processor 610 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the network node may comprise additional components.

The network node 600 may belong to any radio access technology including 4G or LTE, LTE-A, 5G, advanced 5G or a combination thereof that support beamforming technology. The network node comprising the processor and the memory contains instructions executable by the processor, whereby the network node 600 is operative/configured to perform any one of the subject-disclosed in this disclosure including the method according to the appended claims related to the method performed by the network node and the above method steps disclosed in relation to the actions performed by the network node.

Figure 7:
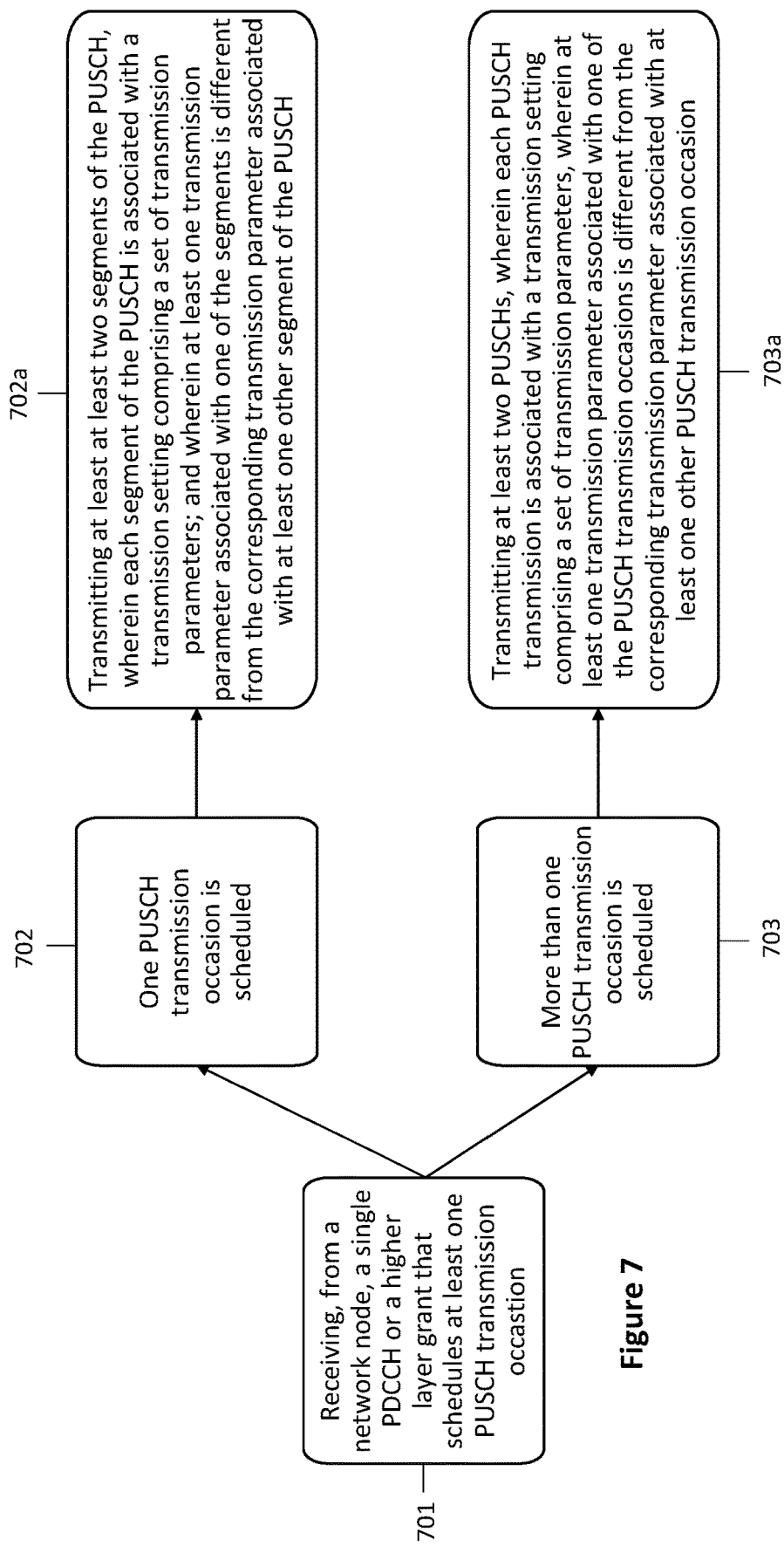
FIG. 7 illustrates a flowchart of a method performed by a UE according to some embodiments.

Referring to FIG. 7 there is illustrated a flowchart of a method performed by a UE according to some exemplary embodiments described earlier. As shown, the method comprises:
- (701) receiving, from a network node, a single PDCCH or a higher layer grant that schedules at least one PUSCH transmission occasion for the UE; wherein
- (702) if one PUSCH transmission occasion is scheduled, the method comprises:
- (702a) transmitting at least at least two segments of the PUSCH, wherein each segment of the PUSCH is associated with a transmission setting comprising a set of transmission parameters; and wherein at least one transmission parameter associated with one of the segments of the PUSCH is different from the corresponding transmission parameter associated with at least one other segment of the PUSCH;
- (703) if more than one PUSCH transmission occasion is scheduled, the method comprises:
- (703a) transmitting at least two PUSCHs, wherein each PUSCH transmission is associated with a transmission setting comprising a set of transmission parameters, wherein at least one transmission parameter associated with one of the PUSCH transmission occasions is different from the corresponding transmission parameter associated with at least one other PUSCH transmission occasion.

As previously described, the transmission setting associated with the PUSCH segment or the PUSCH transmission occasion includes the following transmission parameters: antenna port(s), DMRS port(s), pathloss reference RS for determining a pathloss estimate for the transmission, a TPC command for the transmission, a spatial relation or a beam direction, frequency domain resource(s) and time domain resource(s).

Additional actions performed by the UE have already been described in detail.

Figure 8:
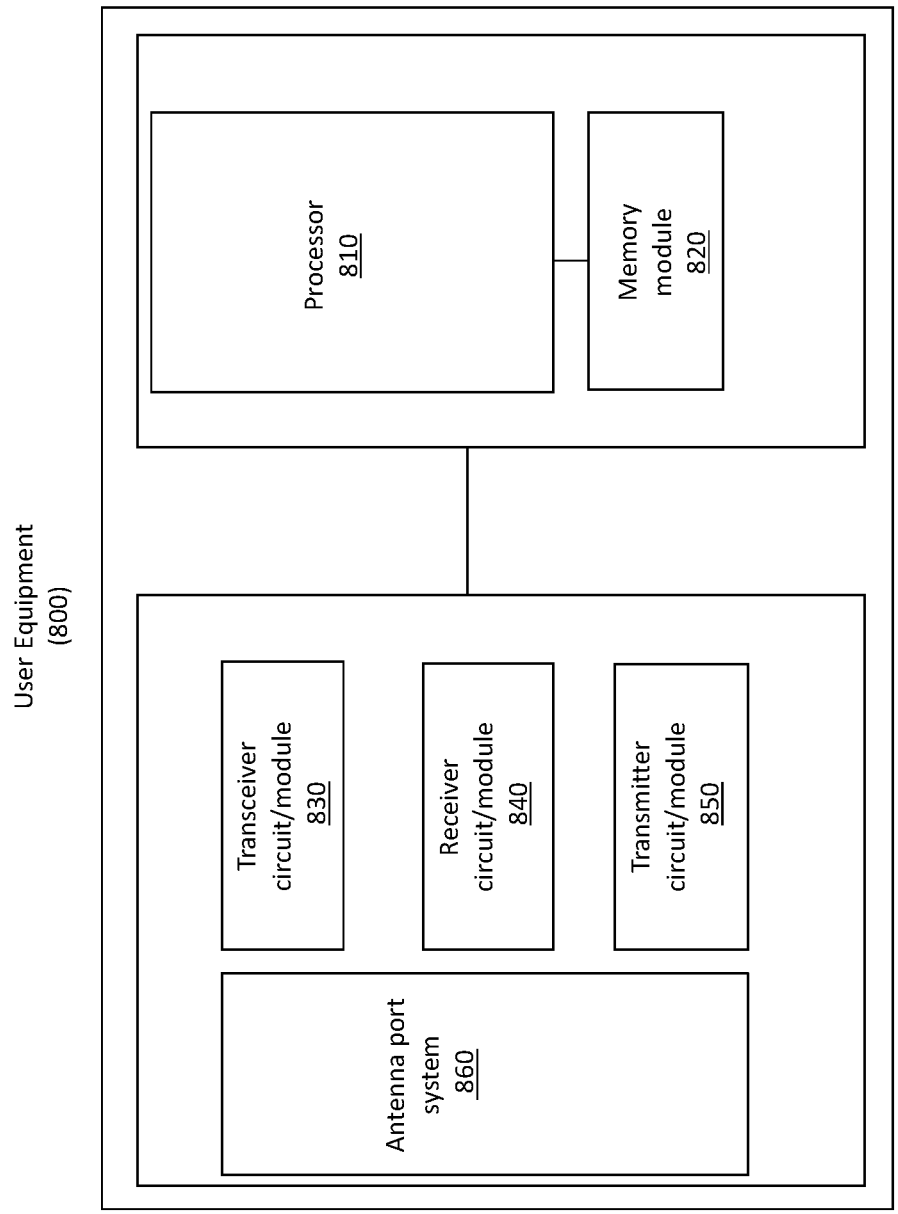
FIG. 8 depicts a block diagram of a UE according to some exemplary embodiments.

In order to perform the previously described process or method steps performed by the UE according to previously described embodiments, there is also provided a UE 800. FIG. 8 illustrates a block diagram depicting a UE. The UE 800 comprises a processor 810 or processing circuit or a processing module or a processor or means 810; a receiver circuit or receiver module 840; a transmitter circuit or transmitter module 850; a memory module 820 a transceiver circuit or transceiver module 830 which may include the transmitter circuit 850 and the receiver circuit 840. The UE 800 further comprises an antenna system 860 which includes antenna circuitry for transmitting and receiving signals to/from at least the network node. The antenna system employs 860 beamforming as previously described. The actions performed by the UE have already been described.

The UE 800 may belong to any radio access technology including 4G or LTE, LTE-A, 5G, advanced 5G or a combination thereof that support beamforming technology. The UE comprising the processor 810 and the memory contains instructions executable by the processor, whereby the UE 800 is operative/configured to perform at least the subject-matter disclosed herein.

The processing module/circuit 810 includes a processor, microprocessor, an application specific integrated circuit (ASIC), field programmable gate array (FPGA), or the like, and may be referred to as the "processor." The processor 810 controls the operation of the UE and its components. Memory (circuit or module) 820 includes a random-access memory (RAM), a read only memory (ROM), and/or another type of memory to store data and instructions that may be used by processor 810. In general, it will be understood that the UE in one or more embodiments includes fixed or programmed circuitry that is configured to carry out the operations in any of the embodiments disclosed herein.

In at least one such example, the processor 810 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure including the method according to anyone of the appending claims related to the method performed by the UE. Further, it will be appreciated that the UE 800 may comprise additional components.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including LTE or 4G, LTE-A (or LTE-Advanced), 5G, advanced 5G, WiMAX, WiFi, satellite communications, TV broadcasting etc.

REFERENCES

[1] 3GPP TS 38.211 V16.0.0: "3GPP; TSG RAN; NR; Physical channels and modulation (Rel. 16).", January 2020.
[2] 3GPP TS 38.212 V16.0.0: "3GPP; TSG RAN; NR; Multiplexing and channel coding (Rel. 16).", January 2020.
[3] 3GPP TS 38.213 V16.0.0: "3GPP; TSG RAN; NR; Physical layer procedures for control (Rel. 16).", January 2020.
[4] 3GPP TS 38.214 V16.0.0: "3GPP; TSG RAN; NR; Physical layer procedures for data (Rel. 16).", January 2020.
[5] 3GPP TS 38.321 V15.8.0: "3GPP; TSG RAN; NR; Medium Access Control (MAC) protocol specification (Rel. 15).", January 2020.
[6] 3GPP TS 38.331 V15.8.0: "3GPP; TSG RAN; NR; Radio Resource Control (RRC); Protocol specification (Rel. 15).", January 2020.
[7] 3GPP TS 38.101-1 V16.2.0: "3GPP; TSG RAN; User Equipment (UE) radio transmission and reception; Part 1: Range 1 Standalone (Rel. 16).", January 2020.

[8] 3GPP TS 38.101-2 V16.2.0: "3GPP; TSG RAN; User Equipment (UE) radio transmission and reception; Part 2: Range 2 Standalone (Rel. 16).", January 2020.

The invention claimed is:

1. A method performed by a user equipment (UE), the method comprising:
receiving from a network node, a single physical downlink control channel (PDCCH), or a higher layer grant that schedules at least two physical uplink shared channel (PUSCH) transmission occasions for the UE;
wherein all the scheduled PUSCH transmission occasions are associated with the same PUSCH transport block;
wherein the scheduling PDCCH or higher layer grant provides:
at least two sounding reference signal (SRS) resources wherein each SRS resource is associated with a different SRS resource set, and wherein an SRS resource set is a higher layer configuration that comprises one or more SRS resources,
at least two transmit power control (TPC) commands, and
one or more Demodulation Reference Signal (DMRS) ports, and
performing the scheduled PUSCH transmissions, wherein each PUSCH transmission is performed using the SRS ports of one of the indicated SRS resources and the indicated DMRS ports, on a set of symbols that is distinct from any other PUSCH transmission scheduled by the PDCCH or higher layer grant, and is associated with one of the indicated TPC commands.

2. The method according to claim 1, further comprising receiving a PDCCH or higher layer grant scheduling at least two PUSCH transmission occasions, wherein the SRS resources are indicated by a SRS resource indicator (SRI) field, and the number of SRS resources indicated being less than or equal to the number of PUSCH transmission occasions.

3. The method according to claim 1, further comprising the transmission of a first PUSCH using a first set of one or more antenna ports associated with a first SRS, resource indicated by the SRI field and a second PUSCH using a second set of one or more antenna ports associated with a second SRS resource indicated by the SRI field.

4. The method according to claim 1, wherein if a number of repetitions of PUSCH transmission occasions is larger than the indicated number of SRS resources or uplink-transmission configuration indication (UL-TCI) states, the UE applying a pattern for cyclic or sequential association between the indicated SRS resources and the PUSCH transmission occasions.

5. The method according to claim 4, wherein when 2n transmissions of a PUSCH are to be performed and the scheduling PDCCH or higher layer grant indicates 2 UL-TCI-states or 2 SRS resources, the first UL-TCI-state or SRS resource is associated with the first PUSCH transmission occasion, the second UL-TCI-state or SRS resource is associated with the second transmission occasion and the same pattern of association is repeated with the remaining PUSCH transmission occasions.

6. The method according to claim 4, wherein when 2n transmissions of a PUSCH are to be performed and the scheduling PDCCH or higher layer grant indicates 2 UL-TCI-states or 2 SRS resources, the first UL-TCI state or SRS resource is associated with odd, 1st, 3rd, . . . (2n−1)-th, PUSCH transmission occasions and the second TCI state is associated with even, 2nd, 4th, . . . (2n)-th, PUSCH transmission occasions, or the first UL-TCI state or SRS resource is associated with the first and second PUSCH transmission occasions, the second UL-TCI state or SRS resource is associated with the third and fourth PUSCH transmission occasions, and the pattern is repeated for the rest of the PUSCH transmission occasions.

7. The method according to claim 1, further comprising, receiving, from the network node, a PDCCH or higher layer grant scheduling at least two PUSCH transmission occasions wherein each PUSCH transmission occasion is scheduled in a different slot.

8. The method according to claim 1, wherein the scheduling of at least two PUSCH transmission occasions by a single PDCCH or a higher layer grant is enabled via the indication of the repetition parameter via the PHY layer or a higher layer.

9. The method according to claim 1, further comprising, receiving from the network node, a higher layer parameter indicating that the UE receives a single PDCCH or a higher layer grant scheduling n (n≥1) PUSCH transmission occasions, and wherein a transmission configuration of the PUSCH transmission is set to a 'multiPUSCH' parameter indicating that the UE receives a single PDCCH that schedules one or more PUSCH transmissions or the higher layer configuration of the PUSCH comprises an additional parameter that indicates the scheduling of one or more PUSCH transmissions using a single PDCCH or a higher layer grant.

10. The method according to claim 1, further comprising, receiving an indication of up to m≥n DMRS ports, p≥m antenna ports and n precoding matrices or vectors $\{F_1, \ldots, F_n\}$ that map m DMRS ports to p antenna ports for n (n>1) PUSCH transmissions via a single PDCCH or via a higher layer grant, wherein the antenna ports are indicated via an SRI field present in the scheduling DCI or the higher layer grant, or via a field that indicates up to n UL-TCI-states in the scheduling DCI or the higher layer grant.

11. The method according to claim 1, wherein if a number of repetitions or transmissions of PUSCH transmission occasions is larger than the indicated number of TPC commands or precoder indications or redundancy versions (RVs) provided for the PUSCH transmission occasions, the UE is configured to enable a cyclic or sequential pattern of application of the TPC commands, precoder indications or redundancy versions for the PUSCH transmission occasions.

12. The method according to claim 11, wherein when 2n transmissions of a PUSCH are scheduled by a PDCCH or higher layer grant and 2 TPC commands/precoder indications/RVs are provided for the PUSCH transmission occasions, the first TPC command/precoder indication/redundancy version is associated with the odd, 1st, 3rd, . . . (2n−1)-th, PUSCH transmission occasions and the second TPC command/precoder indication/redundancy version is associated with the even, 2nd, 4th, . . . (2n)-th, PUSCH transmission occasions, or the first TPC command/precoder indication/redundancy version is associated with the first and second PUSCH transmission occasions, the second TPC command/precoder indication/redundancy version is associated with the third and fourth PUSCH transmission occasions, and the pattern is repeated for the rest of the PUSCH transmission occasions.

13. The method according to claim 1, wherein when a PDCCH or a higher layer grant scheduling more than one PUSCH transmission occasions indicates one or more groups of SRS resources via one or more SRI fields, wherein each group comprises one or more SRS resources, the SRS resource set to which the SRS resources belongs to or associated with is determined based on at least one of the following:

a first group of one or more SRS resources indicated by the SRI fields is associated with an SRS resource set with ID $s_1$ and a second group of one or more SRS resources indicated by the SRI fields which, in terms of the order of indication by the SRI fields, is after said first group of SRS resources, is associated with an SRS resource set with ID $s_2$, wherein $s_2 > s_1$ or $s_2 < s_1$, and wherein the SRI is associated with the most recent transmission of said SRS resource sets using said ordering of the SRS resource set indication;

a first group of one or more SRS resources indicated by the SRI fields is associated with an SRS resource set whose resources were the most recently transmitted before or after a reference time t' and a second group of one or more SRS resources indicated by the SRI fields which, in terms of the order of indication by the SRI fields, is after said first group of one or more SRS resources is associated with an SRS resource set that is the second most recently transmitted before or after said specific time or reference time t', and wherein if the SRI fields indicate SRS resources only from one SRS resource set or if the indication of only one group of one or more SRS resources from one of the SRS resource sets is valid or selected or considered, then the most recently transmitted one with respect to the specific time or reference time t' is the referenced or associated SRS resource set.

14. The method according to claim 1, wherein the received PDCCH or higher layer grant scheduling n>1 transmissions comprises n'≤n SRI fields, wherein a b-bit field is within the SRI field(s) or along with the SRI field(s) or as a separate field, where b≥1, that indicates at least one of the following:
none of the SRS resources indicated by the SRI fields are to be used for the PUSCH transmission occasions scheduled by the PDCCH or higher layer grant;
the SRS resources indicated by at least one of the SRI fields is not used for any of the PUSCH transmission occasions scheduled by the PDCCH or higher layer grant;
the bit field of at least one of the SRI fields is not used to determine the SRS resources from the corresponding SRS resource sets for any of the PUSCH transmission occasions scheduled by the PDCCH or higher layer grant;
the bit fields of only a proper subset of the SRI fields in the PDCCH or higher layer grant are used for at least one PUSCH transmission occasion scheduled by the PDCCH or higher layer grant; and
the SRS resources indicated by every SRI field in the PDCCH or higher layer grant is used for at least one PUSCH transmission occasion scheduled by the PDCCH or higher layer grant.

15. A user equipment (UE) comprising a processor and a memory containing instructions executable by the processor, whereby said UE is configured to:
receive from a network node, a single physical downlink control channel (PDCCH), or a higher layer grant that schedules at least two physical uplink shared channel (PUSCH) transmission occasions for the UE;
wherein all the scheduled PUSCH transmission occasions are associated with the same PUSCH transport block;
wherein the scheduling PDCCH or higher layer grant provides:
at least two sounding reference signal (SRS) resources wherein each SRS resource is associated with a different SRS resource set, and wherein an SRS resource set is a higher layer configuration that comprises one or more SRS resources,
at least two transmit power control (TPC) commands, and
one or more Demodulation Reference Signal (DMRS) ports, and
perform the scheduled PUSCH transmissions, wherein each PUSCH transmission is performed using the SRS ports of one of the indicated SRS resources and the indicated DMRS ports, on a set of symbols that is distinct from any other PUSCH transmission scheduled by the PDCCH or higher layer grant, and is associated with one of the indicated TPC commands.

16. A method performed by a network node, the method comprising:
configuring a user equipment (UE) to receive a single physical downlink control channel (PDCCH) or a higher layer grant that schedules at least two physical uplink shared channel (PUSCH) transmission occasions for the UE;
wherein all the scheduled PUSCH transmission occasions are associated with the same PUSCH transport block;
wherein the scheduling PDCCH or higher layer grant provides:
at least two sounding reference signals (SRS) resources wherein each SRS resource is associated with a different SRS resource set, and wherein an SRS resource set is a higher layer configuration that comprises one or more SRS resources,
at least two transmit power control (TPC) commands, and
one or more Demodulation Reference Signal (DMRS) ports,
for enabling the UE to perform the scheduled PUSCH transmissions, wherein each PUSCH transmission is performed using the SRS ports of one of the indicated SRS resources and the indicated DMRS ports, on a set of symbols that is distinct from any other PUSCH transmission scheduled by the PDCCH or higher layer grant, and is associated with one of the indicated TPC commands.

17. A network node comprising a processor and a memory containing instructions executable by the processor, whereby said network node is configured to:
configure a user equipment (UE) to receive a single physical downlink control channel (PDCCH) or a higher layer grant that schedules at least two physical uplink shared channel (PUSCH) transmission occasions for the UE;
wherein all the scheduled PUSCH transmission occasions are associated with the same PUSCH transport block;
wherein the scheduling PDCCH or higher layer grant provides:
at least two sounding reference signals (SRS) resources wherein each SRS resource is associated with a different SRS resource set, and wherein an SRS resource set is a higher layer configuration that comprises one or more SRS resources,
at least two transmit power control (TPC) commands, and
one or more Demodulation Reference Signal (DMRS) ports,
for enabling the UE to perform the scheduled PUSCH transmissions, wherein each PUSCH transmission is performed using the SRS ports of one of the indicated SRS resources and the indicated DMRS ports, on a set of symbols that is distinct from any other PUSCH transmission scheduled by the PDCCH or higher layer grant, and is associated with one of the indicated TPC commands.

\* \* \* \* \*